United States Patent
Hosotani

(10) Patent No.: US 8,749,996 B2
(45) Date of Patent: Jun. 10, 2014

(54) SWITCHING POWER SUPPLY APPARATUS

(75) Inventor: Tatsuya Hosotani, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/590,207

(22) Filed: Aug. 21, 2012

(65) Prior Publication Data
US 2012/0314454 A1  Dec. 13, 2012

Related U.S. Application Data

(63) Continuation of application No. PCT/JP2011/053222, filed on Feb. 16, 2011.

(30) Foreign Application Priority Data

Mar. 9, 2010  (JP) ................................ 2010-051623

(51) Int. Cl.
H02M 3/335 (2006.01)
(52) U.S. Cl.
USPC ........................................ 363/21.02; 363/16
(58) Field of Classification Search
USPC ........ 363/16, 20, 22, 21.01, 21.02, 21.03, 23, 363/56.01, 95, 97, 131
See application file for complete search history.

(56) References Cited

U.S. PATENT DOCUMENTS

| | | | | |
|---|---|---|---|---|
| 6,061,252 A * | 5/2000 | Hosotani | ........................ | 363/16 |
| 6,320,763 B2 * | 11/2001 | Hosotani | ........................ | 363/16 |
| 6,366,480 B2 * | 4/2002 | Hosotani et al. | ........... | 363/21.14 |
| 6,469,913 B2 * | 10/2002 | Hosotani et al. | ................ | 363/16 |
| 6,639,811 B2 * | 10/2003 | Hosotani et al. | ................ | 363/19 |
| 6,738,266 B2 * | 5/2004 | Hosotani et al. | ................ | 363/16 |
| 6,788,556 B2 * | 9/2004 | Hosotani et al. | ........... | 363/21.15 |
| 6,927,556 B2 * | 8/2005 | Hosotani et al. | .............. | 323/222 |
| 7,778,048 B2 * | 8/2010 | Hosotani | .................... | 363/21.02 |
| 2002/0071295 A1 | 6/2002 | Nishikawa | | |
| 2009/0284991 A1 | 11/2009 | Nishikawa | | |

FOREIGN PATENT DOCUMENTS

| | | |
|---|---|---|
| JP | 07-274498 A | 10/1995 |
| JP | 09-140131 A | 5/1997 |
| JP | 2001-095245 A | 4/2001 |
| JP | 2002-176771 A | 6/2002 |
| JP | 2006-067703 A | 3/2006 |
| JP | 2009-100641 A | 5/2009 |
| JP | 2009-303474 A | 12/2009 |

OTHER PUBLICATIONS

Official Communication issued in International Patent Application No. PCT/JP2011/053222 mailed on May 10, 2011.

\* cited by examiner

*Primary Examiner* — Rajnikant Patel
(74) *Attorney, Agent, or Firm* — Keating & Bennett, LLP

(57) ABSTRACT

In a switching power supply apparatus, a first switching element is controlled by a driving voltage output from a switching control IC. A second switching control circuit controls the on-time of a second switching element so that the time ratio of the on-time of the second switching element to the on-time of the first switching element becomes almost constant with respect to a change in a load current. In a normal load state, since a square wave output from a frequency setting unit within the switching control IC is output with no change, a converter operates in a current-continuous mode. In a light load state, a driving signal generation unit within the switching control IC is subjected to blanking with the period of a signal output from a maximum frequency setting unit and an oscillation frequency is reduced. Accordingly, the converter operates in a current-discontinuous mode.

23 Claims, 25 Drawing Sheets

SWITCHING POWER SUPPLY APPARATUS

BACKGROUND OF THE INVENTION

1. Field of the Invention

The present invention relates to a switching power supply apparatus that maintains high power conversion efficiency under a condition of extensive power supply to a load.

2. Description of the Related Art

In the past, in order to reduce electric power consumption during a standby time of a load circuit serving as a supply destination of a power-supply voltage, i.e., standby power consumption, there has been a switching power supply apparatus causing a converter for a normal time and a converter for a standby time to operate by switching therebetween or a switching power supply apparatus switching between operation modes at a normal time and a standby time in a single converter.

The following three types of switching power supply apparatuses have been used as the switching power supply apparatus switching between the operation modes in the above-mentioned single converter.

The first type is a switching power supply apparatus where, in a flyback converter or the like, at a standby time (i.e., at a time of a light load), the constant of a circuit is changed, the switching frequency of a switching element is reduced, and the number of switching operations per unit time is reduced, thereby reducing a switching loss.

The second type is a switching power supply apparatus where, in a current resonant converter or the like, at a standby time, due to an intermittent oscillation operation in which an oscillation time period and a halt time period are repeated with an oscillation frequency at a high frequency operation being maintained, the number of switching operations per unit time is reduced and a switching loss is reduced, thereby achieving high efficiency.

The third type is a switching power supply apparatus where, at a standby time, by decreasing an output voltage, the power-supply voltage of a switching control circuit is reduced, thereby reducing electric power consumption occurring in the switching control circuit or the like.

FIG. 1 is the circuit diagram of a switching power supply apparatus of the third type and disclosed in Japanese Unexamined Patent Application Publication No. 7-274498. In FIG. 1, when the light load state of a load 8 has been continued for a predetermined time, the operation mode of a control circuit 9 is switched to an electric power saving mode by an operation mode switching mechanism 50, the control frequency of a frequency control mechanism 23 is controlled so as to be high, and the power-supply voltage Vcc of the control circuit 9 is decreased to be near to a minimum allowable operating voltage. Accordingly, in the light load state, the control circuit 9 operates in the vicinity of the minimum allowable operating voltage, thereby reducing electric power consumption, and the efficiency of a resonance-type switching power supply apparatus is improved.

In the first type, usually a converter is configured using one switching element, a large switching surge voltage occurs at both ends of the switching element, in a rated load, and it is necessary for the switching element to have a high-voltage characteristic. In general, since the cost of a high-voltage switching element is high and a voltage drop at the time of conduction is large, a conduction loss is large. As a result, there exists a problem that efficiency in the rated load is lowered.

In the second type, since the intermittent oscillation operation is adopted, there exists a problem that the ripple of an output voltage is large or the period of intermittent oscillation existing in an audible frequency range results in making a sound. Furthermore, since, in an oscillation time period, two FETs operate, there exists a problem that the drive loss of the FET is large or an output response characteristic with respect to the rapid fluctuation of an output load is poor.

In the third type, since a switching frequency becomes high while the power consumption of the switching control circuit or the like is reduced at the standby time, a switching loss becomes large, and the effect of reducing power consumption is small.

SUMMARY OF THE INVENTION

Preferred embodiments of the present invention provide a switching power supply apparatus that achieves a high-efficiency operation with respect to the wide fluctuation of a load ranging from a light load, to a rated load, and to a heavy load and is superior in an output response characteristic.

A switching power supply apparatus according to a preferred embodiment of the present invention includes a direct-current power-supply input unit to which a direct-current input voltage is input, a transformer configured to include at least a primary winding and a secondary winding magnetically coupled to each other, a first series circuit connected to both ends of the direct-current power-supply input unit and in which the primary winding, an inductor, and a first switching element are connected in series, a second series circuit connected to both ends of the first switching element or both ends of a series circuit including the primary winding and the inductor and in which a second switching element and a capacitor are connected in series, a switching control circuit configured to put the second switching element into an on-state during a predetermined time after having put the first switching element into an on-state during a predetermined time, and a first rectification smoothing circuit configured to rectify and smooth an alternating-current voltage output from the secondary winding and output an output voltage to a load, wherein the switching power supply apparatus includes a light load detection mechanism configured to directly or indirectly detect a load current flowing through the load and to detect whether or not the load is in a light load state, the switching control circuit includes a first switching control circuit configured to control an on-time of the first switching element, and a second switching control circuit configured to control an on-time of the second switching element so that an on-time ratio serving as a ratio of the on-time of the second switching element to the on-time of the first switching element becomes almost constant with respect to a change in the load current, in a normal load state, an operation is performed in a current-continuous mode where the first switching element and the second switching element are complementarily and repeatedly put into on-states and off-states, and when the light load detection mechanism has detected the light load state, an operation is performed in a current-discontinuous mode where a current halt time period in which no current flows through the transformer exists between turnoff of the second switching element and turnon of the first switching element.

In addition, a switching power supply apparatus of a preferred embodiment of the present invention preferably includes a direct-current power-supply input unit to which a direct-current input voltage is input, a transformer configured to include at least a primary winding and a secondary winding, magnetically coupled to each other, a first series circuit in which a first switching element and a second switching element, connected to both ends of the direct-current power-supply input unit, are connected in series, a second series circuit configured to be connected to both ends of the second switching element and in which the primary winding, an inductor, and a capacitor are connected in series, a switching control circuit configured to put the second switching element into an on-state during a predetermined time after having put the first switching element into an on-state during a predetermined time, and a first rectification smoothing circuit configured to rectify and smooth an alternating-current voltage output from the secondary winding and output an output voltage to a load, wherein the switching power supply apparatus includes a light load detection mechanism configured to directly or indirectly detect a load current flowing through the load and detect whether or not the load is in a light load state, the switching control circuit includes a first switching control circuit configured to control an on-time of the first switching element, and a second switching control circuit configured to control an on-time of the second switching element so that an on-time ratio serving as a ratio of the on-time of the second switching element to the on-time of the first switching element becomes almost constant with respect to a change in the load current, in a normal load state, an operation is performed in a current-continuous mode where the first switching element and the second switching element are complementarily and repeatedly put into on-states and off-states, and when the light load detection mechanism has detected the light load state, an operation is performed in a current-discontinuous mode where a current halt time period in which no current flows through the transformer exists between turnoff of the second switching element and turnon of the first switching element.

The transformer preferably includes a first drive winding, and a second rectification smoothing circuit that supplies a direct-current power-supply voltage to the switching control circuit is provided in the first drive winding.

A timing detection mechanism configured to detect a timing when the second switching element is turned off and a winding voltage of the transformer is inverted and a feedback circuit configured to generate a feedback signal used to detect and control an output voltage are included, wherein the first switching control circuit is a circuit that causes the first switching element to be turned on with a slight delay after the timing detected by the timing detection mechanism and causes the first switching element to be turned off after a time (the on-time of the first switching element) corresponding to a voltage of the feedback signal has elapsed.

For example, the timing detection mechanism preferably detects a voltage change occurring between both ends of the winding voltage of the transformer.

The timing detection mechanism preferably detects a change in a drain-to-source voltage of at least one of the first switching element and the second switching element.

The timing detection mechanism may also preferably detect a change in a drain current or a source current of at least one of the first switching element and the second switching element.

The timing detection mechanism may further preferably detect a voltage change occurring between both ends of the first drive winding.

The transformer includes a second drive winding, a connection point of the first switching element with the second switching element and a first end of the second drive winding are connected to each other, the second switching control circuit is connected between a second end of the second drive winding and a control terminal of the second switching element, and the second switching control circuit is a circuit that causes the second switching element to be turned on, using a voltage of the second drive winding, which occurs due to turnoff of the first switching element.

The second switching control circuit preferably is a circuit that performs control so that the on-time ratio becomes almost one.

When the on-time ratio, the direct-current input voltage, the output voltage, the number of turns of the primary winding, and the number of turns of the secondary winding are expressed with Da, Vi, Vo, np, and ns, respectively, the second switching control circuit is preferably a circuit that causes the second switching element to be turned off by performing control so that the Da becomes larger than ns·Vi/np·Vo.

The second switching control circuit is a circuit that preferably causes the second switching element to be turned off by performing control so that the Da becomes larger than ns·Vi/np·Vo−1.

The light load detection mechanism preferably performs detection using a voltage of the feedback signal.

The light load detection mechanism also preferably performs detection on the basis of whether or not a switching frequency to drive the first switching element or the second switching element has reached an upper limit value.

In the current-discontinuous mode, along with a decrease in the load current, the switching control circuit preferably causes a switching frequency to drive the first switching element or the second switching element to decrease.

In the current-discontinuous mode, along with a decrease in the load current, the switching control circuit preferably reduces the on-time of the first switching element or the second switching element.

In the current-continuous mode, the switching control circuit preferably sets a maximum level of the switching frequency or a maximum value of the on-time of the first switching element or the second switching element.

In the current-discontinuous mode, the switching control circuit preferably controls the switching frequency or the on-time of the first switching element or the second switching element, in response to the feedback signal.

The switching control circuit preferably sets a limit value on a voltage of the feedback signal, and causes switching of the first switching element or the second switching element to be halted when the voltage of the feedback signal has exceeded the limit value.

The switching control circuit preferably operates with the lowest switching frequency and a minimum on-time, with respect to the limit value.

In the current-discontinuous mode, while the switching control circuit does not cause the second switching element to be turned on even if the first switching element has been turned off, the switching control circuit preferably applies a forward current to a parasitic diode of the second switching element first, and applies a backward current during a subsequent reverse recovery time.

At least one rectifying element provided in the first switching element, the second switching element, or the first rectification smoothing circuit preferably is a field-effect transistor.

The inductor preferably includes a leakage inductance of the transformer.

According to various preferred embodiments of the present invention, the following advantageous effects are obtained.

In the light load state such as the standby time, an operation is performed in the standby mode where the switching frequency is reduced and an operation is performed in the current-discontinuous mode. Accordingly, the number of switching operations per unit time is reduced, the switching loss is significantly reduced and prevent, and hence, it is possible to achieve high efficiency.

Since, in the light load state, the second switching element (high side FET) is put into an on-state for enough time to absorb a surge voltage occurring in the first switching element Q1 when the first switching element (low side FET) is turned off, it is possible to reduce a withstand voltage required for the first switching element Q1.

Since an intermittent oscillation operation is avoided, there is no increase in an output ripple, and the voltage accuracy of the output voltage is excellent.

Since an oscillation halt time period in such a way as intermittent oscillation does not exist, a response characteristic with respect to the rapid change of a load is excellent.

Since, in the light load state such as the standby time, an electric power conversion operation is performed due to almost only the operation of the first switching element (low side FET), it is possible to reduce the drive loss of an FET.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A switching power supply apparatus according to a first preferred embodiment will be described with reference to FIG. 2 to FIG. 7.

Figure 1:
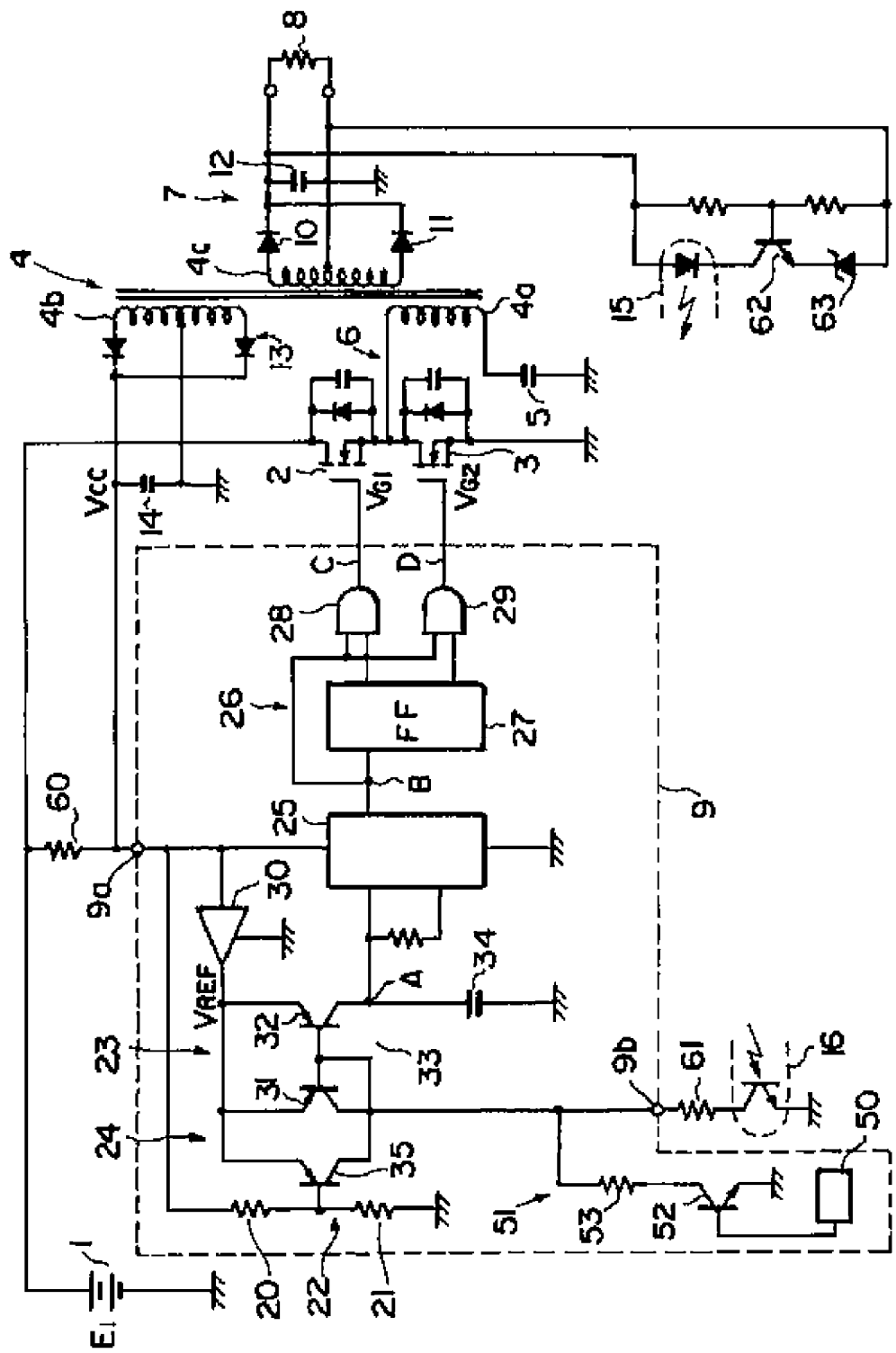
FIG. 1 is a circuit diagram of a switching power supply apparatus disclosed in Japanese Unexamined Patent Application Publication No. 7-274498.
Figure 2:
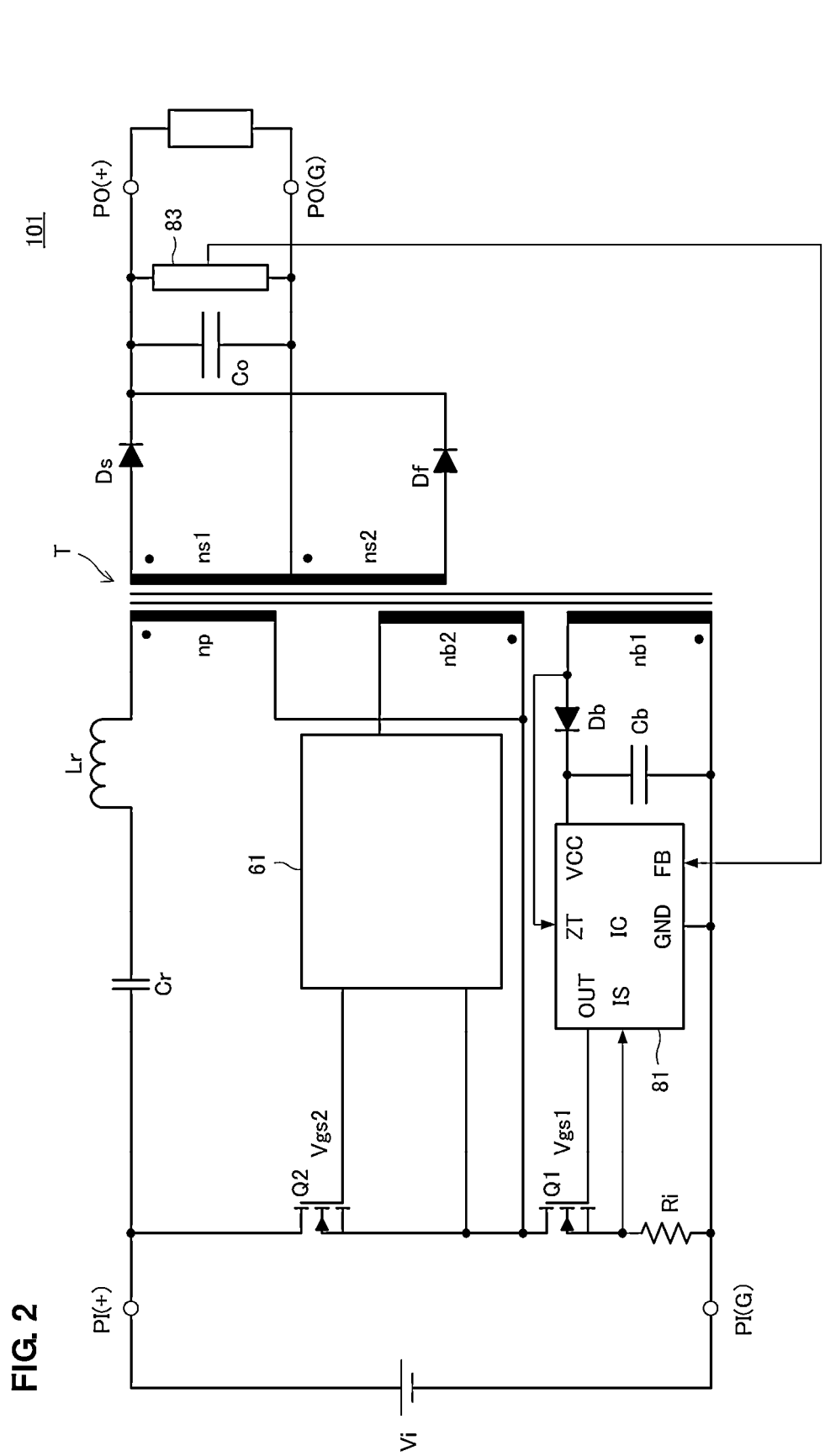
FIG. 2 is a circuit diagram of a switching power supply apparatus 101 according to a first preferred embodiment of the present invention.

FIG. 2 is the circuit diagram of a switching power supply apparatus 101 according to the first preferred embodiment. The voltage of a direct-current input power supply Vi is input between the input terminals PI(+) and PI(G) of this switching power supply apparatus 101. In addition, a predetermined direct-current voltage is output to a load Ro connected between the output terminals PO(+) and PO(G) of the switching power supply apparatus 101.

Between the input terminals PI(+) and PI(G), a first series circuit is provided and includes a first switching element Q1, a second switching element Q2, and a current detection resistor Ri connected in series. The first switching element Q1 and the second switching element Q2 include FETs, the drain terminal of the high-side second switching element Q2 is connected to the input terminal PI(+), and the source terminal of the low-side first switching element Q1 is connected to the input terminal PI(G) through the current detection resistor Ri.

In both ends of the second switching element Q2, a second series circuit is provided and includes a capacitor Cr, the primary winding np of a transformer T, and an inductor Lr connected in series. The inductor Lr is configured using the leakage inductance of the primary winding np of the transformer T.

In the secondary windings ns1 and ns2 of the transformer T, a first rectification smoothing circuit is provided and includes diodes Ds and Df and a capacitor Co. This first rectification smoothing circuit full-wave rectifies, smooths, and outputs an alternating-current voltage, output from the secondary windings ns1 and ns2, to the output terminals PO(+) and PO(G).

A rectification smoothing circuit based on a diode Db and a capacitor Cb is connected to the first drive winding nb1 of the transformer T. A direct-current voltage obtained from the rectification smoothing circuit is supplied between the GND terminal and the VCC terminal of a switching control IC 81, as a power-supply voltage.

The switching control IC 81 corresponds to a first switching control circuit according to a preferred embodiment of the present invention. The switching control IC 81 outputs a driving voltage Vgs1 from the OUT terminal thereof to the gate of the first switching element Q1. The first switching element Q1 performs an on-off operation due to the above-mentioned driving voltage Vgs1.

A second switching control circuit 61 serving as a high side switching control circuit is provided between the second drive winding nb2 of the transformer T and the second switching element Q2. Specifically, the first end of the second drive winding nb2 of the transformer T is connected to a connection point between the first switching element Q1 and the second switching element Q2 (the source terminal of the second switching element Q2), and the second switching control circuit 61 is connected between the second end of the second drive winding nb2 and the gate terminal of the second switching element Q2.

Using the voltage of the second drive winding nb2, which occurs due to the turnoff of the first switching element Q1, the second switching control circuit 61 causes the second switching element Q2 to be turned on. After the second switching element Q2 has been turned on, the on-time of the second switching element Q2 is controlled so that the ratio of the on-time (ton2) of the second switching element Q2 to the on-time (ton1) of the first switching element Q1, namely, an on-time ratio Da (Da=ton2/ton1) becomes almost constant with respect to a change in a load. For example, if the Da is approximately one, the on-times of the Q1 and the Q2 are approximately equal to each other.

A feedback circuit 83 is provided among the output terminals PO(+) and PO(G) and the switching control IC 81. This feedback circuit 83 is a circuit that generates a feedback signal due to the comparison of the voltage-dividing value of a voltage between the output terminals PO(+) and PO(G) with a reference voltage and inputs a feedback voltage to the FB terminal of the switching control IC 81, in an insulating state.

Figure 3:
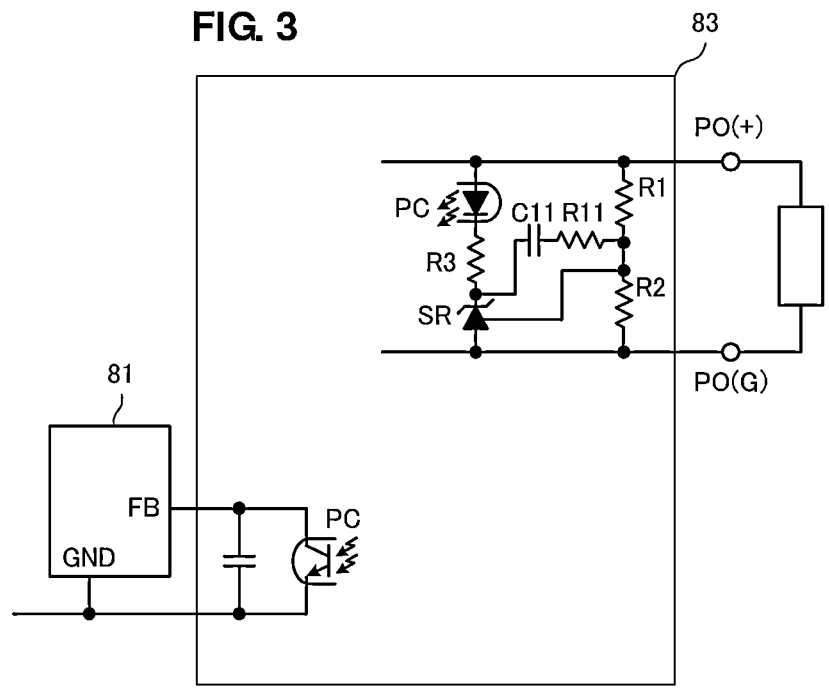
FIG. 3 is a circuit diagram of a feedback circuit 83 in FIG. 2.

FIG. 3 is the circuit diagram of the feedback circuit 83. Between the output terminals PO(+) and PO(G), a series circuit based on a shunt regulator SR, a resistor R3, and a light emitting element of a photo coupler PC and a voltage-dividing circuit based on resistors R1 and R2 are connected. The voltage-dividing output of the above-mentioned voltage-dividing circuit based on the resistors R1 and R2 is provided to the reference terminal of the shunt regulator SR. In addition, between the voltage control end and the reference terminal of the shunt regulator SR, a negative feedback circuit including a resistor R11 and a capacitor C11 is provided. In addition, the light receiving element of the photo coupler PC is connected between the FB terminal and the GND terminal of the switching control IC 81. Within the switching control IC 81, a constant current circuit is connected to the FB terminal.

The feedback circuit 83 functions according to a relationship where when an output voltage to the output terminals PO(+) and PO(G) becomes higher than a setting voltage, the voltage of the FB terminal decreases with that extent.

Figure 4:
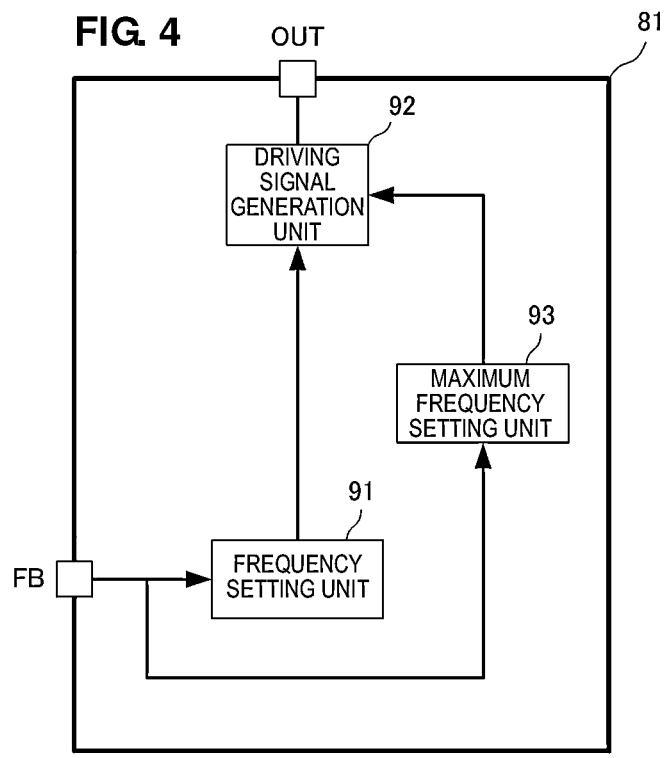
FIG. 4 is a block diagram illustrating a configuration between an FB terminal and an OUT terminal within a switching control IC 81.

FIG. 4 is a block diagram illustrating a configuration between the FB terminal and the OUT terminal within the switching control IC 81. In response to the feedback voltage input to the FB terminal, a frequency setting unit 91 sets the frequency (period) of a driving signal generated by the driving signal generation unit 92. The driving signal generation unit 92 outputs the driving voltage Vgs1 from the OUT terminal to the gate of the first switching element Q1.

The frequency setting unit 91 generates a square-wave signal in a relationship where a switching frequency increases with a decrease in the voltage of the FB terminal, and outputs the square-wave signal to the driving signal generation unit 92.

In a load state that is not a light load state such as a standby time and in which an operation is performed in a normal operation mode, when a load is reduced and the output voltage becomes higher than the setting voltage, for example, the switching frequency increases with that extent. Thus, the on-time of the first switching element Q1 is shortened.

So as to prevent the switching frequency from becoming too high, a maximum frequency setting unit 93 sets the upper limit value (blanking frequency) of the switching frequency. The driving signal generation unit 92 is subjected to blanking with the period of a signal output from the maximum frequency setting unit 93. In a normal load state in which an operation is performed in the normal operation mode, since a square wave output from the frequency setting unit 91 is output with no change, a converter operates in a current-continuous mode. On the other hand, in the light load state in which an operation is performed in a standby operation mode, the period of a signal output from the driving signal generation unit 92 is controlled on the basis of the signal output from the maximum frequency setting unit 93, so as not to become shorter than a setting value. Therefore, in a state where this restriction is imposed, while the on-times of the first switching element Q1 and the second switching element Q2 become short, a blank time is inserted between a time when the Q2 is turned off and a time when the Q1 is turned on next. Accordingly, the converter operates in a current-discontinuous mode.

Figure 5:
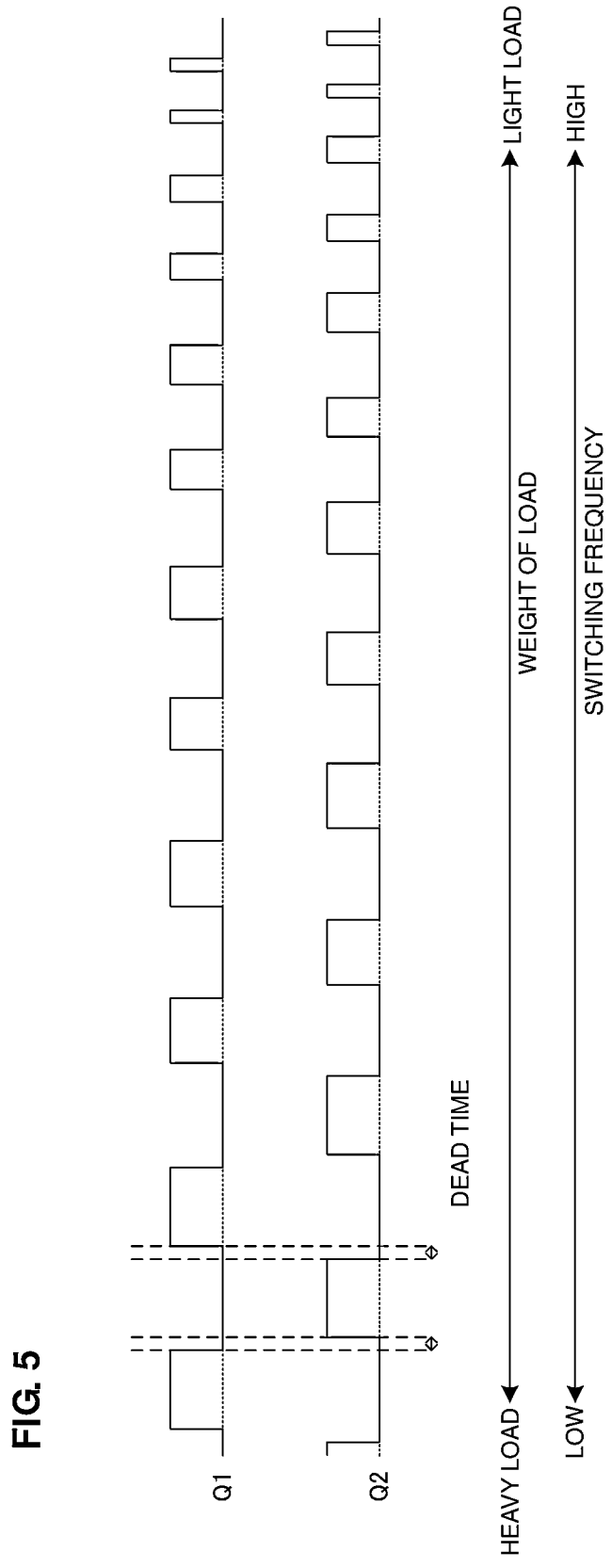
FIG. 5 is a diagram illustrating a change in a switching frequency due to a change in a weight of a load, in a normal load state.

FIG. 5 is a diagram illustrating a change in a switching frequency due to a change in the weight of a load, in the load state of a normal operation mode.

As described above, after the second switching element Q2 has been turned on, the second switching control circuit 61 in FIG. 2 controls the on-time of the second switching element Q2 so that the on-time ratio Da becomes almost constant. FIG. 5 corresponds to a case where the Da is approximately one. In this regard, however, a dead time is provided between the on-time period of the first switching element Q1 and the on-time period of the second switching element Q2.

In this way, in the normal load state, an operation is performed in the current-continuous mode, in a relationship where the switching frequency increases with a decrease in the load.

Figure 6:
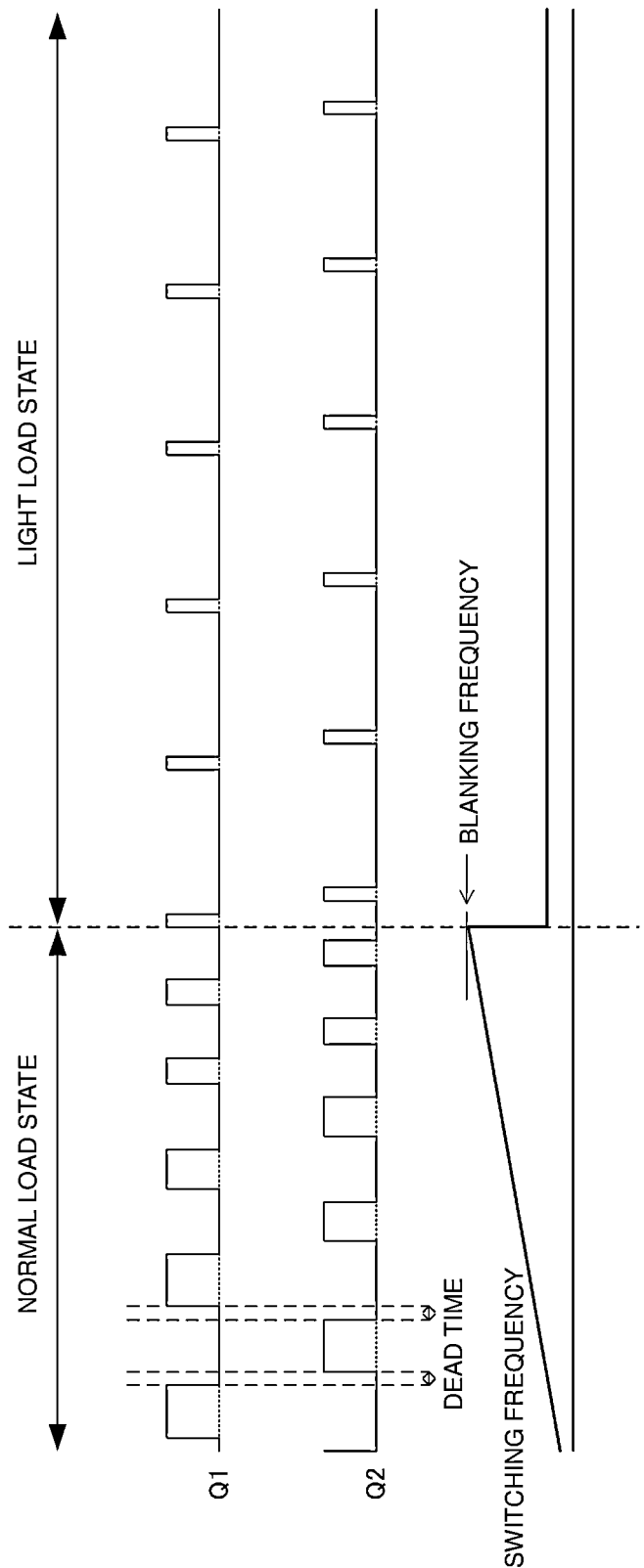
FIG. 6 is a diagram illustrating a change in a switching frequency and a change of a mode when a transition from a normal load state to a light load state has occurred.

FIG. 6 is a diagram illustrating a change in the switching frequency and the change of a mode when a transition from the normal load state to the light load state has occurred.

In the normal load state, an operation is performed in the current-continuous mode in such a way as described above, and the switching frequency increases with a decrease in the load. After the switching frequency has reached the blanking frequency, even if the load becomes lighter, the frequency of the driving voltage output from the driving signal generation unit 92 illustrated in FIG. 4 does not become greater than or equal to the maximum frequency, due to the effect of the maximum frequency setting unit 93. Therefore, in the light load state where the blanking frequency is reached, while the on-times of the switching elements Q1 and Q2 decrease with a decrease in the load, a blank time is inserted during a period up to the turnon of the switching elements Q1 and Q2. As a result, in the light load state, an operation is performed in the current-discontinuous mode.

Figure 7:
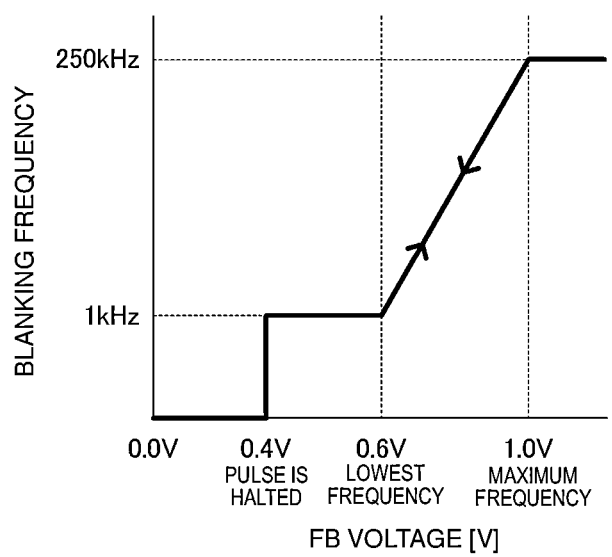
FIG. 7 is a diagram illustrating a relationship between a voltage of the FB terminal and a blanking frequency within the switching control IC 81.

FIG. 7 is a diagram illustrating a relationship between the voltage of the above-mentioned FB terminal and a blanking frequency. In this example, when the voltage of the FB terminal is lower than about 0.4 V, for example, (a no-load state or an approximate no-load state), a switching operation is halted. In an interval in which the voltage of the FB terminal is about 0.4 V to about 0.6 V, for example, an operation is performed with the switching frequency of 1 kHz, and in an interval in which the voltage of the above-mentioned FB terminal is about 0.6 V to about 1.0 V, for example, the switching frequency linearly changes. When the voltage of the FB terminal is higher than about 1.0 V, for example, (the normal load state), a maximum blanking frequency becomes about 250 kHz, for example.

Accordingly, since, in the light load state, the switching frequency does not exceed about 250 kHz and the switching frequency further decreases with a decrease in the load, a power conversion loss is even more significantly reduced and prevented.

In addition, the blanking frequency may be fixed (for example, about 130 kHz) independently of the voltage of the FB terminal. In addition, the maximum on-time of the switching element may be set independently of the voltage of the FB terminal.

As illustrated above, since, in the light load state, the second switching element (high side FET) Q2 is put into an on-state for enough time period to absorb the surge voltage occurring when the first switching element Q1 (low side FET) is turned off, it is possible to reduce the withstand voltage of the FET.

In addition, since an intermittent oscillation operation is avoided, there is no increase in an output ripple, and the voltage accuracy of the output voltage is excellent. Furthermore, since an oscillation halt time period in such a way as intermittent oscillation does not exist, a response characteristic with respect to the rapid change of a load is excellent.

In addition, since, in the light load state such as the standby time, the electric power conversion operation is performed due to almost only the operation of the first switching element Q1 (low side FET), it is possible to reduce a drive loss in the switching element.

In addition, when, in the light load state, a voltage occurring in the second drive winding nb2 does not reach a voltage required to turn on the second switching element Q2, a reverse current flows through a parasitic diode (not illustrated) of the second switching element Q2 during the reverse recovery time of the parasitic diode. Accordingly, even if the second switching element Q2 is not put into an on-state, a current flows through the parasitic diode of the second switching element Q2, first in a forward direction and then in a reverse direction. Accordingly, it is possible to absorb the surge voltage occurring in the first switching element Q1.

Second Preferred Embodiment

Figure 8:
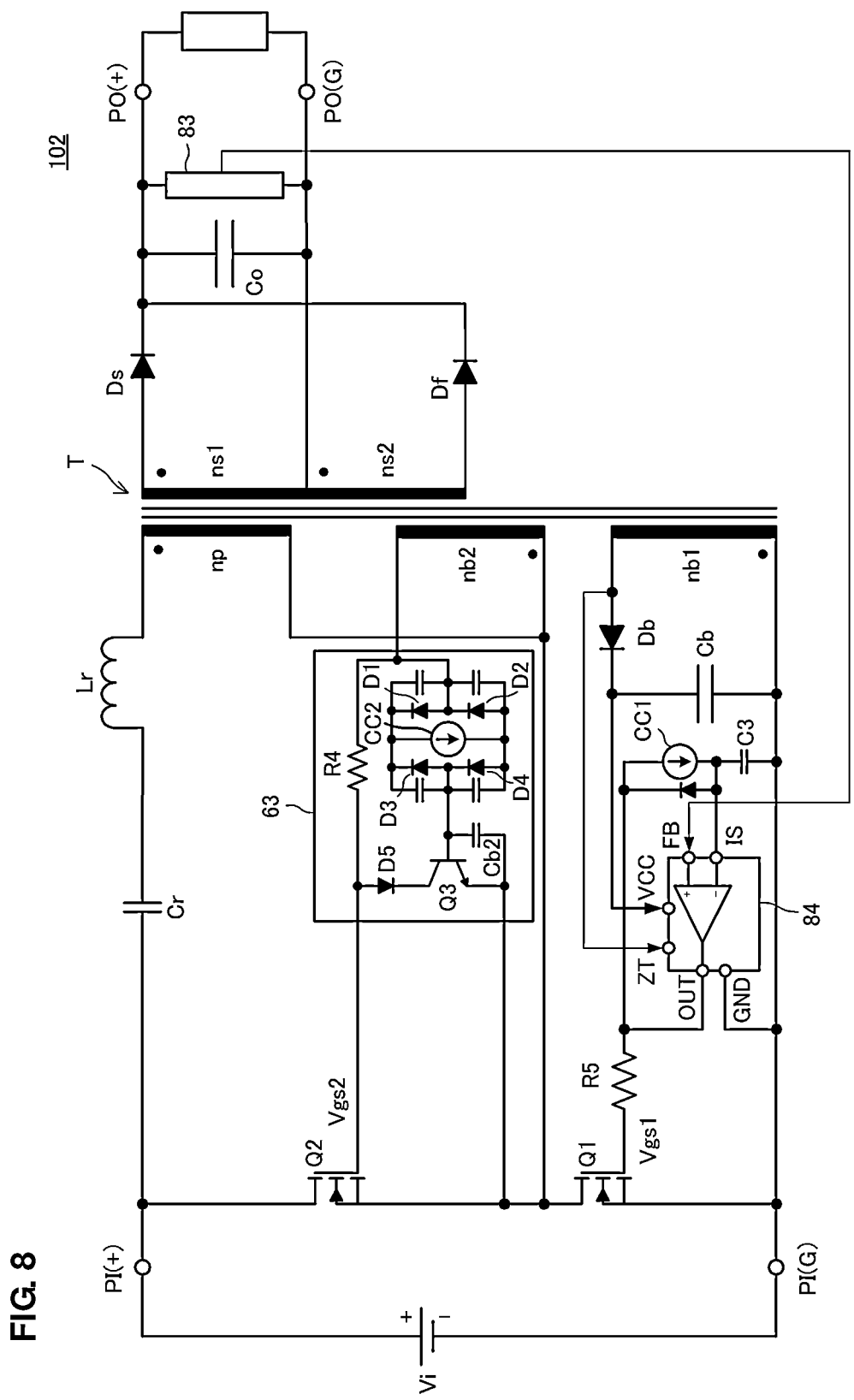
FIG. 8 is a circuit diagram of a switching power supply apparatus 102 according to a second preferred embodiment of the present invention.

FIG. 8 is the circuit diagram of a switching power supply apparatus 102 according to a second preferred embodiment. While being different from the switching power supply apparatus 101 according to the first preferred embodiment illustrated in FIG. 2, FIG. 8 specifically illustrates the configuration of a switching control IC 84 and the configuration of a second switching control circuit 63.

A series circuit including a constant current circuit CC1 and a capacitor C3 is connected to the OUT terminal of the switching control IC 84, and connected so that the charging voltage of the capacitor C3 is input to an IS terminal.

The voltage of a counter electromotive force induced in the first drive winding nb1 due to the turnoff of the second switching element Q2 is input to a ZT terminal, and hence, the switching control IC 84 puts the OUT terminal into a high level. Accordingly, the first switching element Q1 is turned on.

On the basis of the input voltage of the ZT terminal, the switching control IC 84 detects a timing when the second switching element Q2 is turned off and the winding voltage of the transformer T is inverted. This configuration corresponds to a "timing detection mechanism" according to a preferred embodiment of the present invention.

Due to the voltage of the OUT terminal of the switching control IC 84, the constant current circuit CC1 constant-current charges the capacitor C3. A comparator within the switching control IC 84 compares the voltage of the capacitor C3 with the voltage of the FB terminal, and when the voltage of the capacitor C3 has become equal to the voltage of the FB terminal, the first switching element Q1 is turned off. Accordingly, the voltage of the FB terminal decreases with an increase in an output voltage to the output terminals PO(+) and PO(G), and hence, the charging time of the capacitor C3 is shortened. Accordingly, the on-time of the first switching element Q1 is shortened. Due to such a mechanism, the output voltage to the output terminals PO(+) and PO(G) is controlled so as to become a constant voltage.

On the other hand, when the first switching element Q1 has been turned on, the capacitor Cb2 is discharged with a constant current through the path of the capacitor Cb2→a diode D3→the constant current circuit CC2→a diode D2→the second drive winding nb2 due to a voltage induced in the second drive winding nb2, in the second switching control circuit 63, and a negative voltage occurs.

After that, when the first switching element Q1 has been turned off, a positive voltage is applied to the second switching element Q2 through a resistor R4 due to the voltage induced in the second drive winding nb2, and the Q2 is turned on. In addition, the electric charge of the capacitor Cb2 is constant-current charged in a positive direction through the path of the second drive winding nb2→4 a diode D1→the constant current circuit CC2→a diode D4→the capacitor Cb2. When the voltage of the capacitor Cb2 has exceeded about 0.6 V serving as the threshold voltage of a transistor, for example, the transistor Q3 is put into an on-state, and accordingly, the second switching element Q2 is turned off. The charging time of the capacitor Cb2, i.e., the on-time of the first switching element Q1, and the discharging time of the capacitor Cb2, i.e., the on-time of the second switching element Q2, become equal to each other, and the on-time ratio Da is controlled so as to be approximately one.

Third Preferred Embodiment

Figure 9:
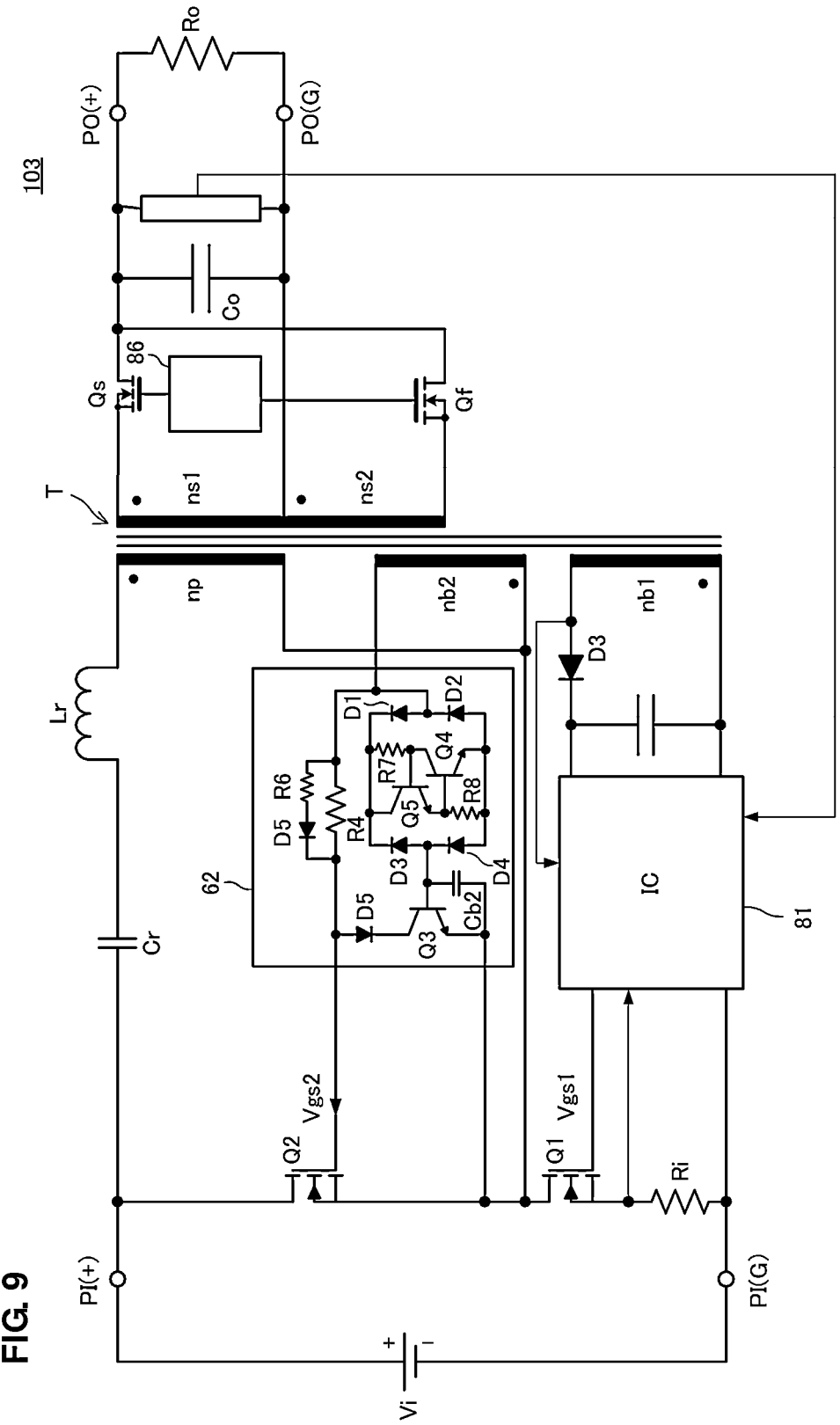
FIG. 9 is a circuit diagram of a switching power supply apparatus 103 according to a third preferred embodiment of the present invention.

FIG. 9 is the circuit diagram of a switching power supply apparatus 103 according to a third preferred embodiment. A second switching control circuit 62 in the switching power supply apparatus 103 is different from FIG. 8. In addition, a circuit on a secondary side is different from the circuits illustrated in FIG. 2 and FIG. 8.

In the second switching control circuit 62, a constant current circuit preferably includes transistors Q4 and Q5 and resistors R7 and R8. Accordingly, the basic circuit operation of the second switching control circuit 62 is the same as the second switching control circuit 63 illustrated in FIG. 8. In addition, a series circuit including a diode D5 and a resistor R6 is connected in parallel to a resistor R4. Therefore, the rise of the driving voltage Vgs2 of the second switching element Q2 is set due to the parallel impedance of the R4 and the R6, and the fall thereof is dominantly set only due to the impedance of the R4.

An FET Qs and an FET Qf used for rectification are connected to the secondary windings ns1 and ns2 of the transformer T. A secondary side switching control circuit 86 performs switching of the FET Qs and FET Qf in synchronization with a change in an electromotive voltage occurring in the secondary winding ns1 or ns2 of the transformer T.

In this way, synchronous rectification is performed using a rectifying FET in place of a rectifier diode, and hence, it is possible to reduce a conduction loss occurring due to the flow of a current.

Figure 10:
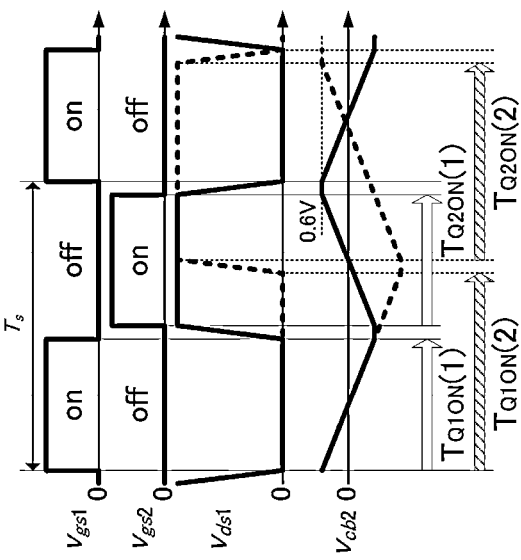
FIG. 10 is a waveform diagram illustrating a relationship among a gate-to-source voltage Vgs1 of a first switching element Q1, a gate-to-source voltage Vgs2 of a second switching element Q2, a drain-to-source voltage Vds1 of the first switching element Q1, and a voltage of a capacitor Cb2.

FIG. 10 is a waveform diagram illustrating a relationship among the gate-to-source voltage Vgs1 of the first switching element Q1, the gate-to-source voltage Vgs2 of the second switching element Q2, the drain-to-source voltage Vds1 of the first switching element Q1, and the voltage of the capacitor Cb2 in FIG. 8 or FIG. 9.

When the first switching element Q1 has been put into an on-state, a negative voltage is induced in the high side drive winding nb2, and the charging voltage VCb2 of the capacitor Cb2 decreases from about 0.6 V serving as the threshold voltage, for example. After that, when the first switching element Q1 has been turned off, a positive voltage is induced in the high side drive winding nb2, and the charging voltage VCb2 of the capacitor Cb2 increases. When the charging voltage VCb2 of this capacitor Cb2 has exceeded about 0.6 V serving as the threshold voltage, for example, the transistor Q3 is put into an on-state. Accordingly, the gate electric potential of the second switching element Q2 becomes 0 V, and the second switching element Q2 is turned off. Since the capacitor Cb2 is charged and discharged with the constant current of a same current value, the slope of the charging voltage VCb2 is equal. Thus, a charge-discharge current ratio Di is 1:1. Therefore, the on-time of the second switching element Q2 is equal to the on-time of the first switching element Q1.

In FIG. 10, $T_{Q1ON}(1)$ and $T_{Q2ON}(1)$ are equal to each other due to the above-mentioned operation. Here, when the on-time of the first switching element Q1 has been lengthened and has become $T_{Q1ON}(2)$, the Vds1 and the Vcb2 correspond to a waveform diagram illustrated by dotted lines. Also at this time, the $T_{Q1ON}(2)$ and $T_{Q2ON}(2)$ are equal to each other due to the above-mentioned operation.

Fourth Preferred Embodiment

Figure 11:
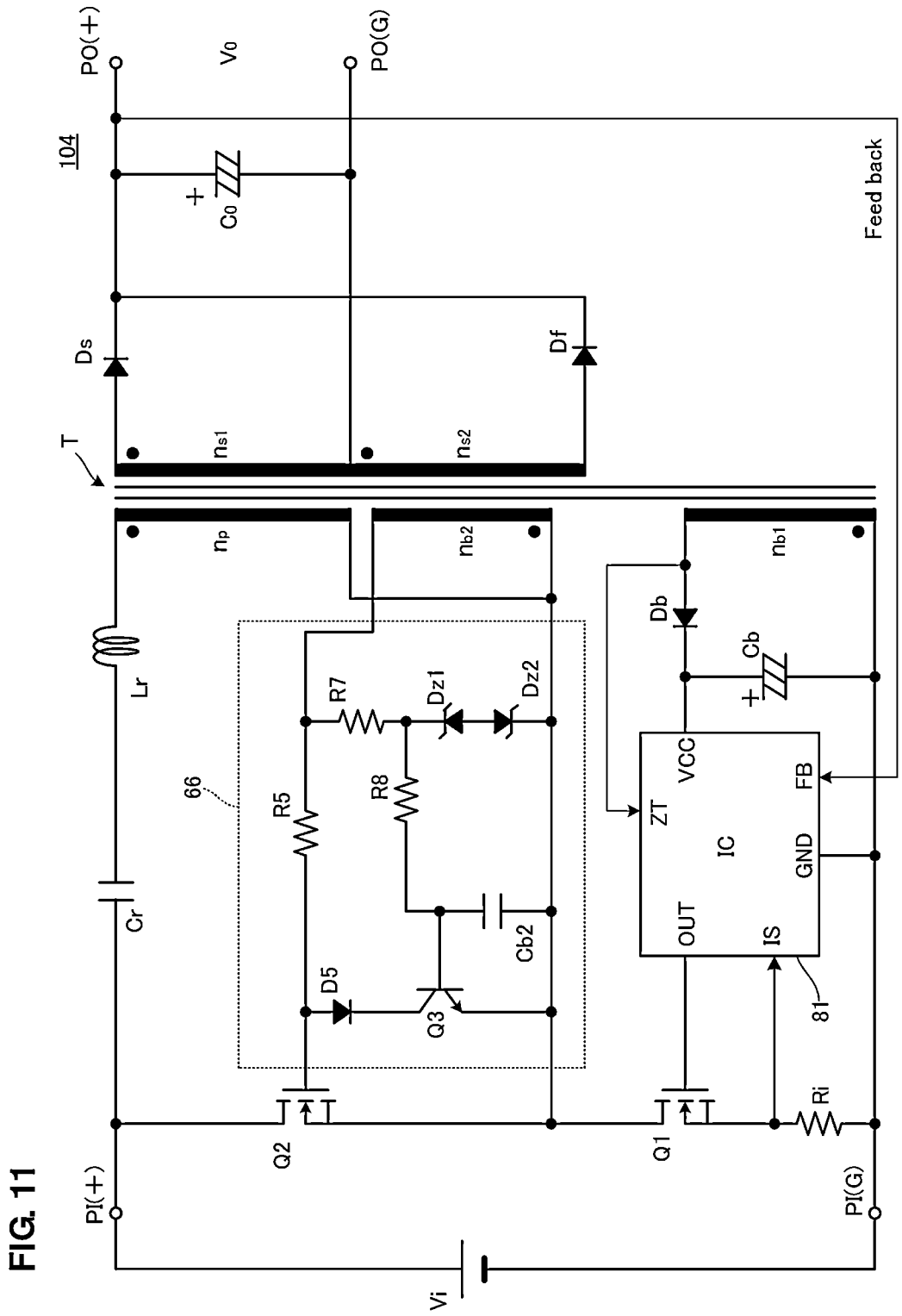
FIG. 11 is a circuit diagram of a switching power supply apparatus 104 according to a fourth preferred embodiment of the present invention.

FIG. 11 is the circuit diagram of a switching power supply apparatus 104 according to a fourth preferred embodiment.

While being different from the switching power supply apparatus illustrated in the first preferred embodiment, a feedback circuit is simply illustrated and only the path of feedback is expressed using one line (Feed back). In addition, the configuration of a second switching control circuit 66 is different. In this example, a circuit is provided in which two zener diodes Dz1 and Dz2 are connected in series in a reverse direction and furthermore a resistor R7 is connected in series. This circuit inputs thereto the output voltage of the high side drive winding nb2 and bi-directionally generates a constant voltage. A voltage between both ends of the zener diodes Dz1 and Dz2 connected in series is applied to a charge-discharge circuit based on a capacitor Cb2 and a resistor R8.

In order to cause the currents of the charge and discharge of the capacitor Cb2 to be equal to each other, the zener voltages of the two zener diodes Dz1 and Dz2 are basically equal to each other.

Figure 12:
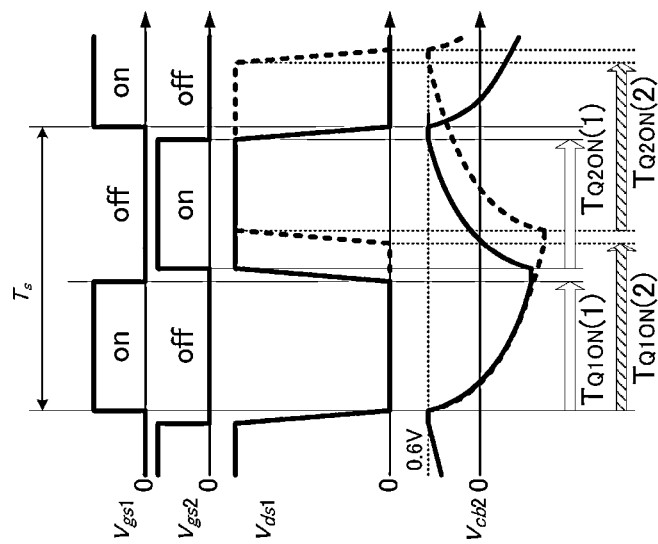
FIG. 12 is a waveform diagram illustrating a relationship among a gate-to-source voltage Vgs1 of a first switching element Q1, a gate-to-source voltage Vgs2 of a second switching element Q2, a drain-to-source voltage Vds1 of the first switching element Q1, and a voltage Vcb2 of a capacitor Cb2 in FIG. 11.

FIG. 12 is a waveform diagram illustrating a relationship among the gate-to-source voltage Vgs1 of the first switching element Q1, the gate-to-source voltage Vgs2 of the second switching element Q2, the drain-to-source voltage Vds1 of the first switching element Q1, and the voltage Vcb2 of the capacitor Cb2 in FIG. 11.

First, when the first switching element Q1 has been turned on, a negative voltage induced in the high side drive winding nb2 is stabilized to be a constant voltage by a series circuit including the zener diodes Dz1 and Dz2 and the resistor R7, and applied to a time constant circuit based on the capacitor Cb2 and the resistor R8.

After that, when the first switching element Q1 has been turned off, a positive voltage induced in the high side drive winding nb2 is applied through a resistor R5 and the positive voltage is applied to the second switching element Q2. Therefore, the Q2 is turned on. In addition, when the positive voltage induced in the high side drive winding nb2 is stabilized to be a constant voltage by the series circuit including the zener diodes Dz1 and Dz2 and the resistor R7, and the above-mentioned stabilized positive voltage is applied to the time constant circuit based on the capacitor Cb2 and the resistor R8.

A transistor Q3 is put into an on-state at a time when the voltage of the capacitor Cb2 exceeds about 0.6 V serving as the threshold voltage, for example, and accordingly the second switching element Q2 is turned off.

According to the above-mentioned operation, the charging time of the capacitor Cb2, i.e., the on-time of the first switching element Q1, and the discharging time of the capacitor Cb2, i.e., the on-time of the second switching element Q2, become approximately equal to each other.

In FIG. 12, $T_{Q1ON}(1)$ and $T_{Q2ON}(1)$ are equal to each other due to the above-mentioned operation. Here, when the on-time of the first switching element Q1 has been lengthened and has become $T_{Q1ON}(2)$, the Vds1 and the Vcb2 correspond to a waveform diagram illustrated by dotted lines. Also at this time, the $T_{Q1ON}(2)$ and $T_{Q2ON}(2)$ are equal to each other due to the above-mentioned operation.

Fifth Preferred Embodiment

Figure 13:
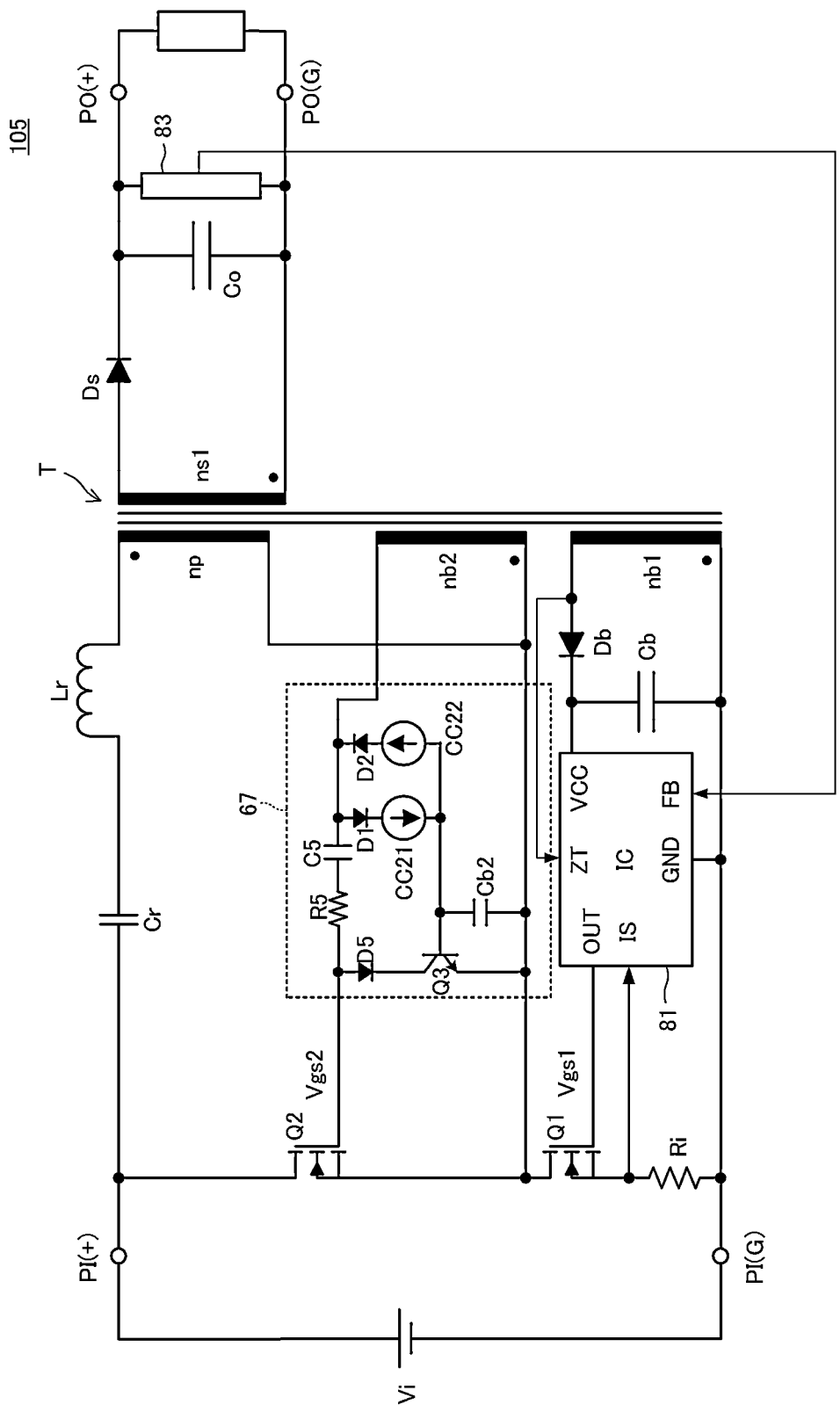
FIG. 13 is a circuit diagram of a switching power supply apparatus 105 according to a fifth preferred embodiment of the present invention.

FIG. 13 is the circuit diagram of a switching power supply apparatus 105 according to a fifth preferred embodiment.

While, in the second to fourth preferred embodiments, the on-time ratio Da (=$T_{Q2ON}/T_{Q1ON}$)=1 is preferably satisfied, the fifth preferred embodiment is an example corresponding to a case where the on-time ratio Da (=$T_{Q2ON}/T_{Q1ON}$)≠1 is preferably satisfied.

While being different from the switching power supply apparatus illustrated in the first preferred embodiment, a circuit configuration on a secondary side is the circuit configuration of a flyback method, and the switching power supply apparatus is configured using a rectification smoothing circuit including a diode Ds and a capacitor Co. The configuration of a second switching control circuit 67 is also different. In this example, two constant current circuits CC21 and CC22, diodes D1 and D2 to prevent backflow, and a capacitor C5 are provided.

When the first switching element Q1 has been turned on, the capacitor Cb2 is discharged, due to a voltage induced in the high side drive winding nb2, in a negative direction with a constant current through the path of the capacitor Cb2→the constant current circuit CC22→the diode D2→the high side drive winding nb2.

After that, when the first switching element Q1 has been turned off, a positive voltage is applied to the second switching element Q2 through a resistor R5 and the capacitor C5, due to a positive voltage induced in the high side drive winding nb2, and the Q2 is turned on. In addition, the capacitor Cb2 is charged in a positive direction with a constant current through the path of the high side drive winding nb2→the diode D1→the constant current circuit CC21→the capacitor Cb2. The transistor Q3 is put into an on-state at a time when the voltage of the capacitor Cb2 exceeds about 0.6 V serving as the threshold voltage, for example, and accordingly the second switching element Q2 is turned off.

Since a charge current and a discharge current to the capacitor Cb2 are independently defined, the discharging time of the capacitor Cb2, i.e., the on-time of the first switching element Q1, and the charging time of the capacitor Cb2, i.e., the on-time of the second switching element Q2, are different from each other. In this regard, however, a ratio between the charging time and the discharging time for the capacitor Cb2 is constant, and has a proportional relationship (linear) with the on-time of the first switching element Q1. Therefore, the on-time ratio Da (=$T_{Q2ON}/T_{Q1ON}$) is maintained constant due to a preliminarily defined relationship.

Here, for example, it is assumed that an electric power converter circuit has a circuit configuration to which a flyback converter is applied. Furthermore, a case will be described where, after the switching element Q2 has been turned off, the reset time of a transformer is over, the switching element Q1 is turned on by utilizing the inversion of a transformer voltage due to the finish of the reset of the transformer, and hence, a current flowing through the transformer is caused to operate in a current critical mode.

If an operation is performed in the current critical mode, it is easy to achieve a zero voltage switching operation. In addition to this, it is possible to reduce a loss associated with the reverse recovery time of a rectifier diode on a secondary side, and it is possible to realize a highly efficient operation under a specific design condition. However, if an operation is performed in the current critical mode, the on-time of the switching element Q1 changes greatly with respect to the fluctuation of a load in such a way as an RCC (ringing choke converter) and the switching frequency fluctuates greatly. It has been very difficult for the related art to change the on-time of the switching element Q2 so as to follow such a fluctuation of the switching frequency. In the present preferred embodiment, such a problem is solved as follows.

In FIG. 13, when a direct-current input voltage, an output voltage, the number of turns of a primary winding, and the number of turns of a secondary winding are expressed with Vi, Vo, np, and ns, respectively, a relational expression of ts·Vi/np=tr·Vo/ns is preferably satisfied between a time ts to excite the transformer and a time tr to reset the transformer, due to the continuity of the magnetic flux of the transformer. Accordingly, the ratio of the time tr to reset the transformer to the time ts to excite the transformer may be expressed as tr/ts=(ns·Vi)/(np·Vo).

Here, the product, $T_{Q1ON}$·Ib1, of the discharging time $T_{Q1ON}$ and the discharge current value Ib1 of the capacitor Cb1 turns out to be a discharging electric charge amount. In the same way, a charging electric charge amount is expressed as $T_{Q2ON}$·Ib2. In a steady state, since the discharging electric charge amount and the charging electric charge amount are equal to each other, $T_{Q1ON}$·Ib1=$T_{Q2ON}$·Ib2 turns out to be satisfied. Accordingly, the on-time ratio Da=$T_{Q2ON}/T_{Q1ON}$=Ib1/Ib2=1/Di is satisfied.

Here, when a setting is performed with Di (=1/Da)>(tr/ts), i.e., Da<(tr/ts), even if the on-time $T_{Q1ON}$ of the switching element Q1 has changed, the on-time $T_{Q2ON}$ of the switching element Q2 is constantly shorter than the reset time tr of the transformer. In such a setting, it turns out that the reset time of the transformer is over after the switching element Q2 has been turned off. In addition to this, the switching element Q1 is turned on by utilizing the inversion of a transformer voltage due to the finish of the reset of the transformer, and hence, it is possible to cause a current flowing through the transformer to operate in the current critical mode. Furthermore, even if the on-time of the switching element Q1 has changed greatly with respect to the fluctuation of a load, the on-time of the switching element Q2 is changed so as to follow this, and it is possible to realize an operation in the current critical mode.

In the present preferred embodiment, a setting is performed so that the relationship of Di=1/Da is preferably satisfied between the charge-discharge current ratio Di (=Ib2/Ib1) and the on-time ratio Da (=$T_{Q2ON}/T_{Q1ON}$) and the Di is larger than (ns·Vi)/(np·Vo), and the on-time of the second switching element Q2 is controlled so that the on-time ratio (Da) becomes almost constant with respect to a change in a load current. Accordingly, it is possible to cause the converter to operate in the current critical mode. In addition, even if the on-time of the switching element Q1 changes with respect to a change in a load and a switching period changes, zero-voltage switching is achieved, and it is possible to reduce a loss associated with the reverse recovery time of the rectifier diode on the secondary side.

By controlling in such a way, it is possible to cause an operation corresponding to the current-discontinuous mode in the light load state to be performed in the flyback method in the same way as in the first preferred embodiment.

Figure 14:
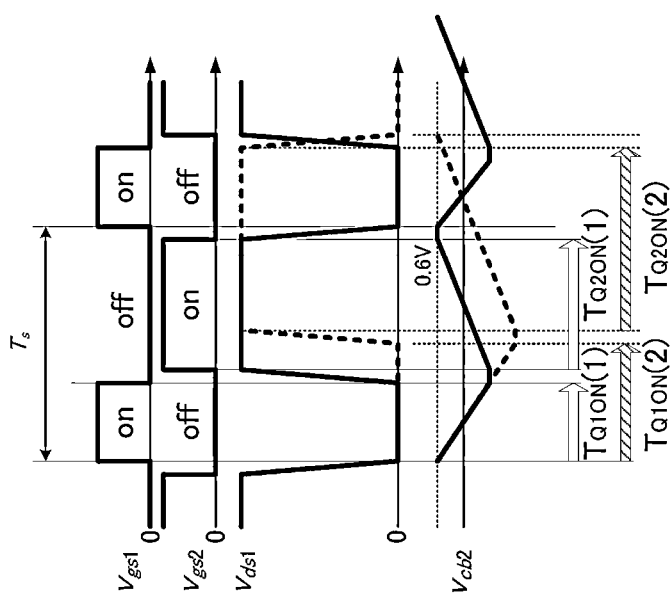
FIG. 14 is a waveform diagram illustrating a relationship among a gate-to-source voltage Vgs1 of a first switching element Q1, a gate-to-source voltage Vgs2 of a second switching element Q2, a drain-to-source voltage Vds1 of the first switching element Q1, and a voltage Vcb2 of a capacitor Cb2 in FIG. 13.

FIG. 14 is a waveform diagram illustrating a relationship among the gate-to-source voltage Vgs1 of the first switching element Q1, the gate-to-source voltage Vgs2 of the second switching element Q2, the drain-to-source voltage Vds1 of the first switching element Q1, and the voltage Vcb2 of the capacitor Cb2 in FIG. 13.

When the first switching element Q1 has been put into an on-state, a negative voltage is induced in the high side drive winding nb2, and the charging voltage VCb2 of the capacitor Cb2 decreases from about 0.6 V serving as the threshold voltage, for example. After that, when the first switching element Q1 has been turned off, a positive voltage is induced in the high side drive winding nb2, and the charging voltage VCb2 of the capacitor Cb2 increases. When the charging voltage VCb2 of this capacitor Cb2 exceeds about 0.6 V serving as the threshold voltage, for example, the transistor Q3 is put into an on-state. Accordingly, the gate electric potential of the second switching element Q2 becomes 0 V, and the second switching element Q2 is turned off.

Since the capacitor Cb2 is charged by the constant current circuit CC21 and discharged by the constant current circuit CC22, the slope of the upswing of the charging voltage VCb2 and the slope of the downswing thereof are different from each other. However, even if the on-time of the first switching element Q1 has changed, each of the slope of the upswing of the charging voltage VCb2 and the slope of the downswing thereof is constant. Therefore, the on-time ratio Da ($=T_{Q1ON}/T_{Q2ON}$) is maintained constant due to a preliminarily defined relationship. In FIG. 14, a waveform diagram when the on-time of the switching element Q1 is $T_{Q1ON}(1)$ is indicated by a solid line, and a waveform diagram when the on-time of the switching element Q1 changes to $T_{Q1ON}(2)$ is indicated by a dotted line.

Sixth Preferred Embodiment

Figure 15:
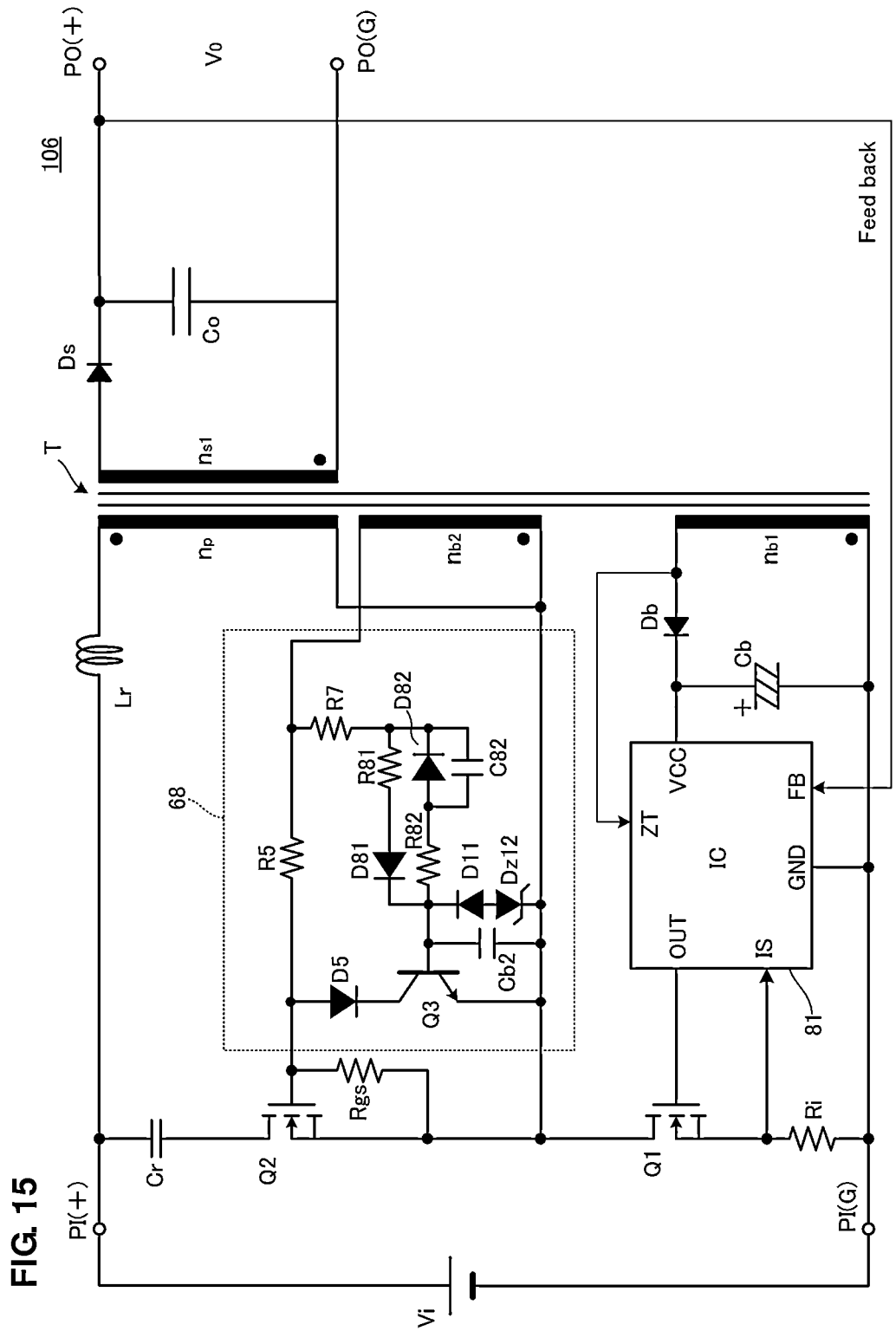
FIG. 15 is a circuit diagram of a switching power supply apparatus 106 according to a sixth preferred embodiment of the present invention.

FIG. 15 is the circuit diagram of a switching power supply apparatus 106 according to a sixth preferred embodiment.

The position of the capacitor Cr and the configuration of a second switching control circuit 68 are different from the switching power supply apparatus illustrated in FIG. 13. In this example, a series circuit including a resistor R81 and a diode D81 and a series circuit including a resistor R82 and a diode D82 are connected in parallel to each other, and a resistor R7 is connected in series to this parallel circuit. This series circuit is connected between the high side drive winding nb2 and the capacitor Cb2. In addition, a circuit where a diode D11 and a zener diode Dz12 are connected in series to each other in a reverse direction is connected between both ends of the capacitor Cb2.

According to this circuit configuration, the output voltage of the high side drive winding nb2 is input, and a constant voltage is bi-directionally generated. In this regard, however, since a charge current with respect to the capacitor Cb2 flows through the resistor R81 and a discharge current flows through the resistor R82, a charging time constant and a discharging time constant with respect to the capacitor Cb2 are different from each other.

In addition, a capacitor C82 is connected in parallel to the diode D82, and hence, this capacitor C82 also causes the charging time constant and the discharging time constant with respect to the capacitor Cb2 to be different from each other. It is possible to accumulate electric charge in the capacitor C82 during a time period when a backward voltage is applied to the diode D82, and it is possible to discharge the electric charge accumulated in the capacitor C82, during a dead time when the voltage of the high side drive winding nb2 changes. As a result, it is possible to pass a current whose phase leads compared with a case where only a rectifier diode is used. Accordingly, it is possible to adjust the amount of the current of charge and discharge with respect to the capacitor Cb2, and, using the capacitor C82, it is possible to correct the distortion of a charge-discharge current at a dead time, in particular, when the direction of the charge-discharge current with respect to the capacitor Cb2 changes.

In addition, the circuit where the diode D11 and the zener diode Dz12, connected between both ends of the capacitor Cb2, are connected in series to each other in the reverse direction clamps a voltage applied between the base and emitter of the transistor Q3 in a reverse direction, and it is possible to protect an excess voltage from being applied.

Figure 16:
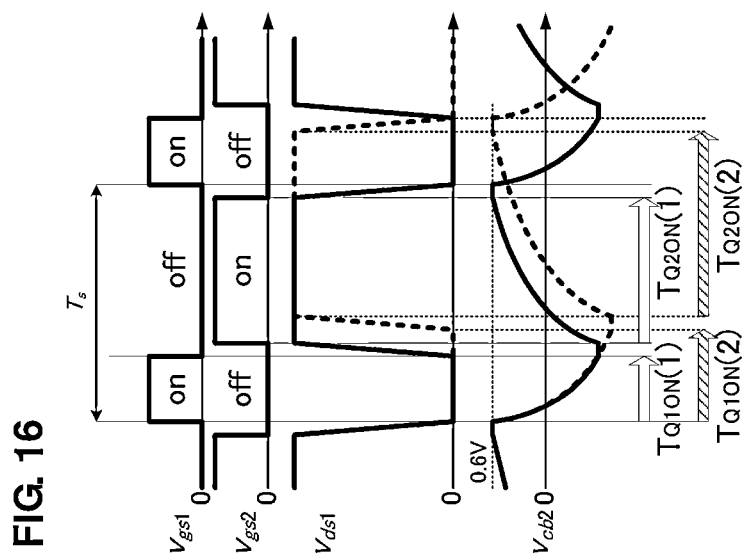
FIG. 16 is a waveform diagram illustrating a relationship among a gate-to-source voltage Vgs1 of a first switching element Q1, a gate-to-source voltage Vgs2 of a second switching element Q2, a drain-to-source voltage Vds1 of the first switching element Q1, and a voltage Vcb2 of a capacitor Cb2 in FIG. 15.

FIG. 16 is a waveform diagram illustrating a relationship among the gate-to-source voltage Vgs1 of the first switching element Q1, the gate-to-source voltage Vgs2 of the second switching element Q2, the drain-to-source voltage Vds1 of the first switching element Q1, and the voltage Vcb2 of the capacitor Cb2 in FIG. 15.

When the first switching element Q1 has been put into an on-state, a negative voltage is induced in the high side drive winding nb2, and the charging voltage VCb2 of the capacitor Cb2 decreases from about 0.6 V serving as the threshold voltage, for example. After that, when the first switching element Q1 has been turned off, a positive voltage is induced in the high side drive winding nb2, and the charging voltage VCb2 of the capacitor Cb2 increases. When the charging voltage VCb2 of this capacitor Cb2 exceeds about 0.6 V serving as the threshold voltage, for example, the transistor Q3 is put into an on-state. Accordingly, the gate electric potential of the second switching element Q2 becomes 0 V, and the second switching element Q2 is turned off.

While the charging time constant and the discharging time constant with respect to the capacitor Cb2 are different from each other, a ratio therebetween is approximately constant. Therefore, the on-time ratio Da ($=T_{Q2ON}/T_{Q1ON}$) is maintained constant due to a preliminarily defined relationship.

In addition, in FIG. 15, if necessary, a resistor Rgs to discharge electric charge is connected between the gate terminal and the source terminal of the second switching element Q2.

Here, in the same way as the description in the fifth preferred embodiment, a case will be described where, after the switching element Q2 has been turned off, the reset time of a transformer is over, the switching element Q1 is turned on by utilizing the inversion of a transformer voltage due to the finish of the reset of the transformer, and hence, a current flowing through the transformer is caused to operate in the current critical mode.

In FIG. 15, when a direct-current input voltage, an output voltage, the number of turns of a primary winding, and the number of turns of a secondary winding are expressed with Vi, Vo, np, and ns, respectively, a relational expression of ts·(Vi−np·Vo/ns)=tr·np·Vo/ns is preferably satisfied between a time ts to excite the transformer and a time tr to reset the transformer, due to the continuity of the magnetic flux of the transformer. Accordingly, the ratio of the time tr to reset the transformer to the time ts to excite the transformer may be expressed as tr/ts=(ns·Vi)/(np·Vo)−1.

Here, the product, $T_{Q1ON}$·Ib1, of the discharging time $T_{Q1ON}$ and the discharge current value Ib1 of the capacitor Cb1 turns out to be a discharging electric charge amount. In the same way, a charging electric charge amount is expressed as $T_{Q2ON}$·Ib2. In a steady state, since the discharging electric charge amount and the charging electric charge amount are equal to each other, $T_{Q1ON}$·Ib1=$T_{Q2ON}$·Ib2 turns out to be satisfied. Accordingly, the on-time ratio Da=$T_{Q2ON}/T_{Q1ON}$=Ib1/Ib2=1/Di is preferably satisfied.

Here, when a setting is performed with Di (=1/Da)>(tr/ts), namely, Da<(tr/ts), even if the on-time $T_{Q1ON}$ of the switching element Q1 changes, the on-time $T_{Q2ON}$ of the switching element Q2 is constantly shorter than the reset time tr of the transformer. In such a setting, it turns out that the reset time of the transformer is over after the switching element Q2 has been turned off. In addition to this, the switching element Q1 is turned on by utilizing the inversion of a transformer voltage due to the finish of the reset of the transformer, and hence, it is possible to cause a current flowing through the transformer to operate in the current critical mode. Furthermore, even if the on-time of the switching element Q1 has changed greatly with respect to the fluctuation of a load, the on-time of the switching element Q2 is changed so as to follow this, and it is possible to realize an operation in the current critical mode.

In the present preferred embodiment, a setting is performed so that the relationship of Di=1/Da is preferably satisfied between the charge-discharge current ratio Di (=Ib2/Ib1) and the on-time ratio Da (=$T_{Q2ON}/T_{Q1ON}$) and the Di is preferably larger than (ns·Vi)/(np·Vo)−1, and the on-time of the second switching element Q2 is controlled so that the on-time ratio (Da) preferably becomes almost constant with respect to a change in a load current. Accordingly, it is possible to cause the converter to operate in the current critical mode. In addition, even if the on-time of the switching element Q1 changes with respect to a change in a load and a switching period changes, zero-voltage switching is achieved, and it is possible to reduce a loss associated with the reverse recovery time of the rectifier diode on the secondary side.

Seventh Preferred Embodiment

Figure 17:
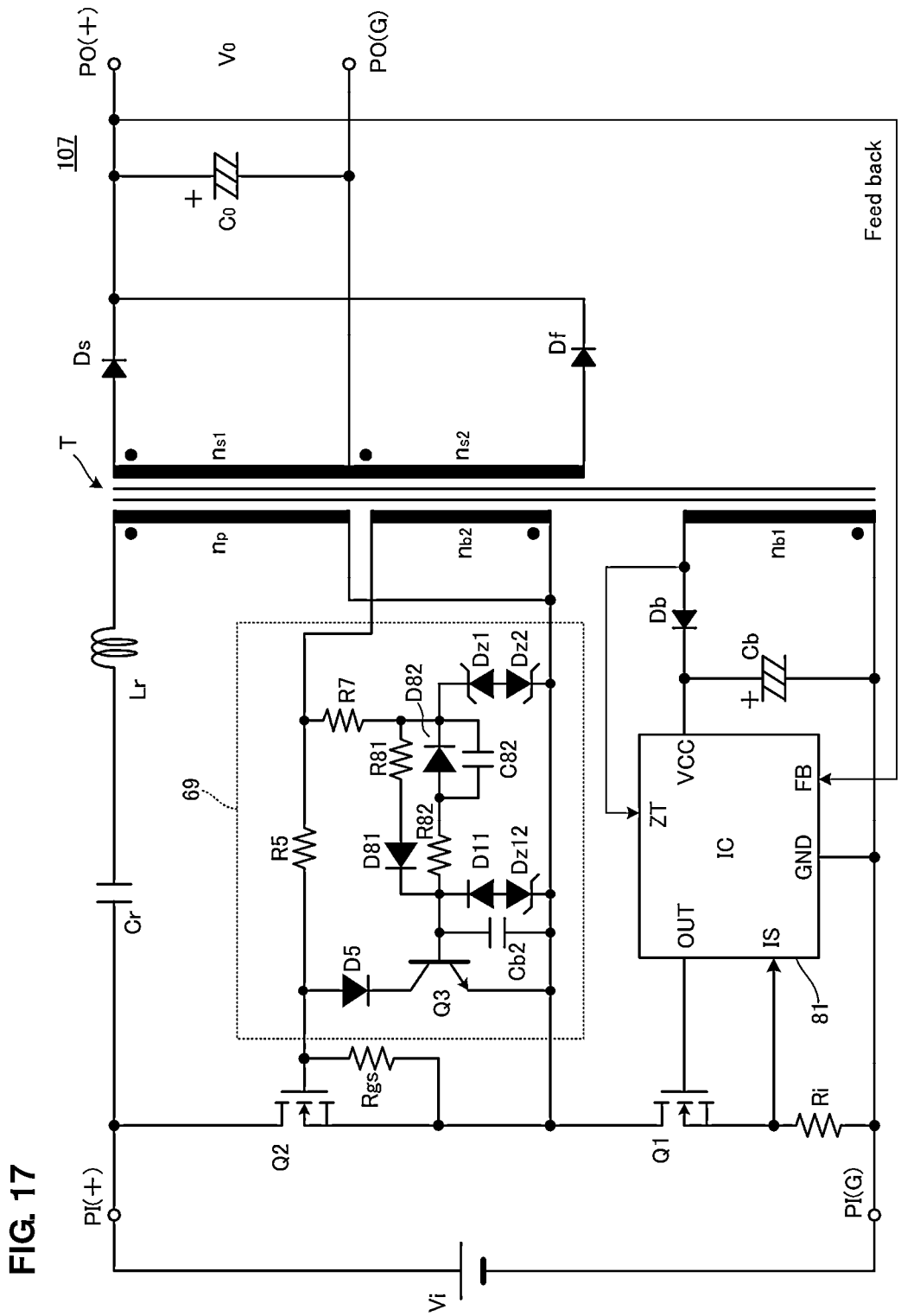
FIG. 17 is a circuit diagram of a switching power supply apparatus 107 according to a seventh preferred embodiment of the present invention.

FIG. 17 is the circuit diagram of a switching power supply apparatus 107 according to a seventh preferred embodiment.

The configuration of a second switching control circuit 69 is different from the switching power supply apparatus illustrated in FIG. 15. In this example, a series circuit including the resistor R81 and the diode D81 and a series circuit including the resistor R82 and the diode D82 are connected in parallel to each other, and a circuit where two zener diodes Dz1 and Dz2 are connected in series to each other in a reverse direction is connected between the connection point of this parallel circuit with the resistor R7 and one end of the high side drive winding nb2. That is, the zener diodes Dz1 and Dz2 are added.

In this way, the output of the high side drive winding nb2 is input to a series circuit including the zener diodes Dz1 and Dz2 and the resistor R7, and a voltage for the series circuit of the zener diodes Dz1 and Dz2 is supplied. Therefore, it is possible to significantly reduce and correct an influence due to the fluctuation of the voltage of the high side drive winding nb2.

Eighth Preferred Embodiment

Figure 18:
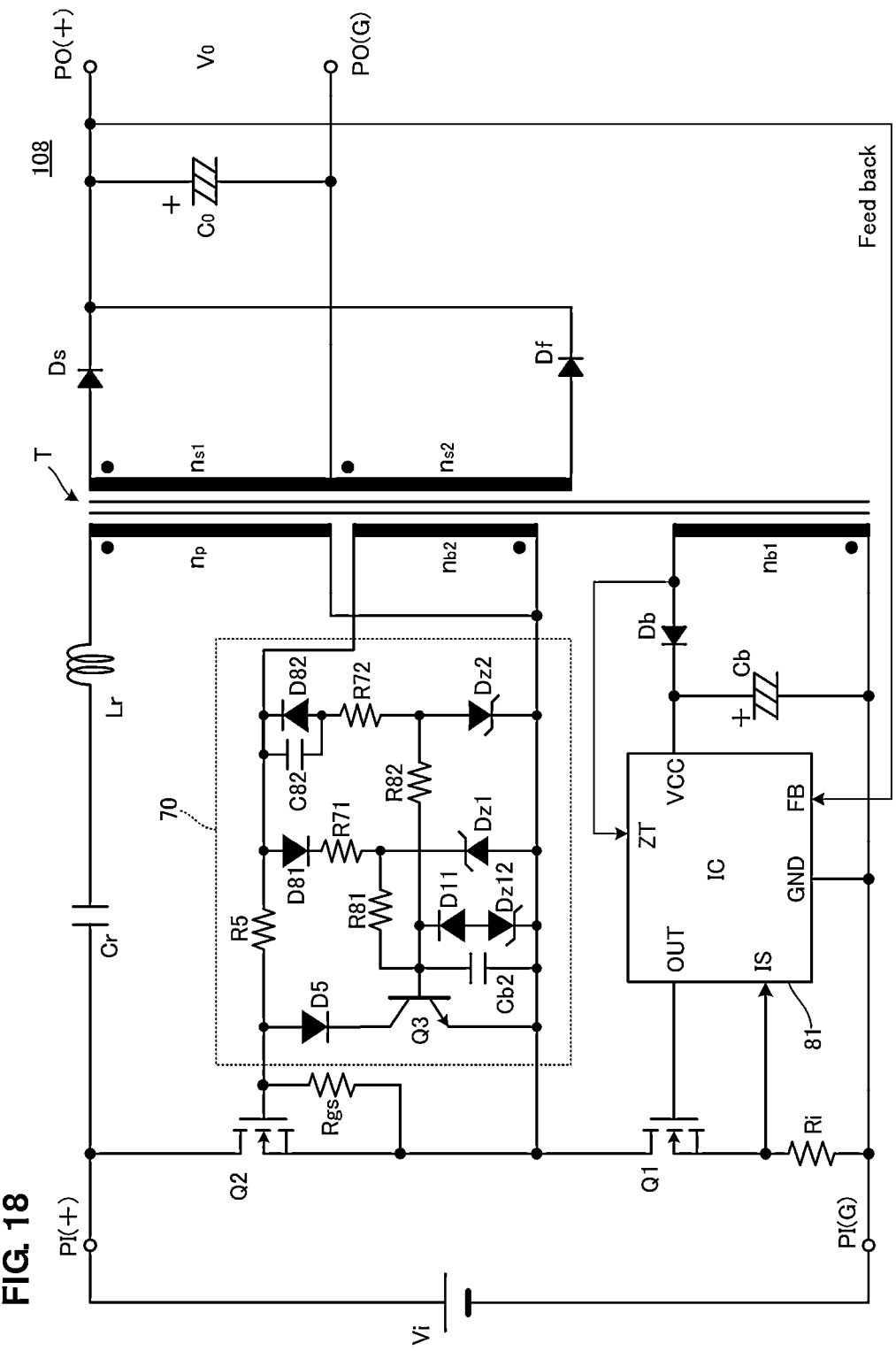
FIG. 18 is a circuit diagram of a switching power supply apparatus 108 according to an eighth preferred embodiment of the present invention.

FIG. 18 is the circuit diagram of a switching power supply apparatus 108 according to an eighth preferred embodiment.

The configuration of a second switching control circuit 70 is different from the switching power supply apparatus illustrated in FIG. 17. While a connection relationship between the zener diodes Dz1 and Dz2 and another connection relationship are different, a function effect is basically the same as the seventh preferred embodiment.

In this way, the output of the high side drive winding nb2 is input to a series circuit including the zener diodes Dz1 and Dz2 and resistors R71 and R72, and a voltage applied to the zener diode Dz1 or Dz2 is supplied to a series circuit including the capacitor Cb1 and the resistor R81 or R82. Therefore, it is possible to significantly reduce and correct an influence due to the fluctuation of the voltage of the high side drive winding nb2.

Ninth Preferred Embodiment

Figure 19:
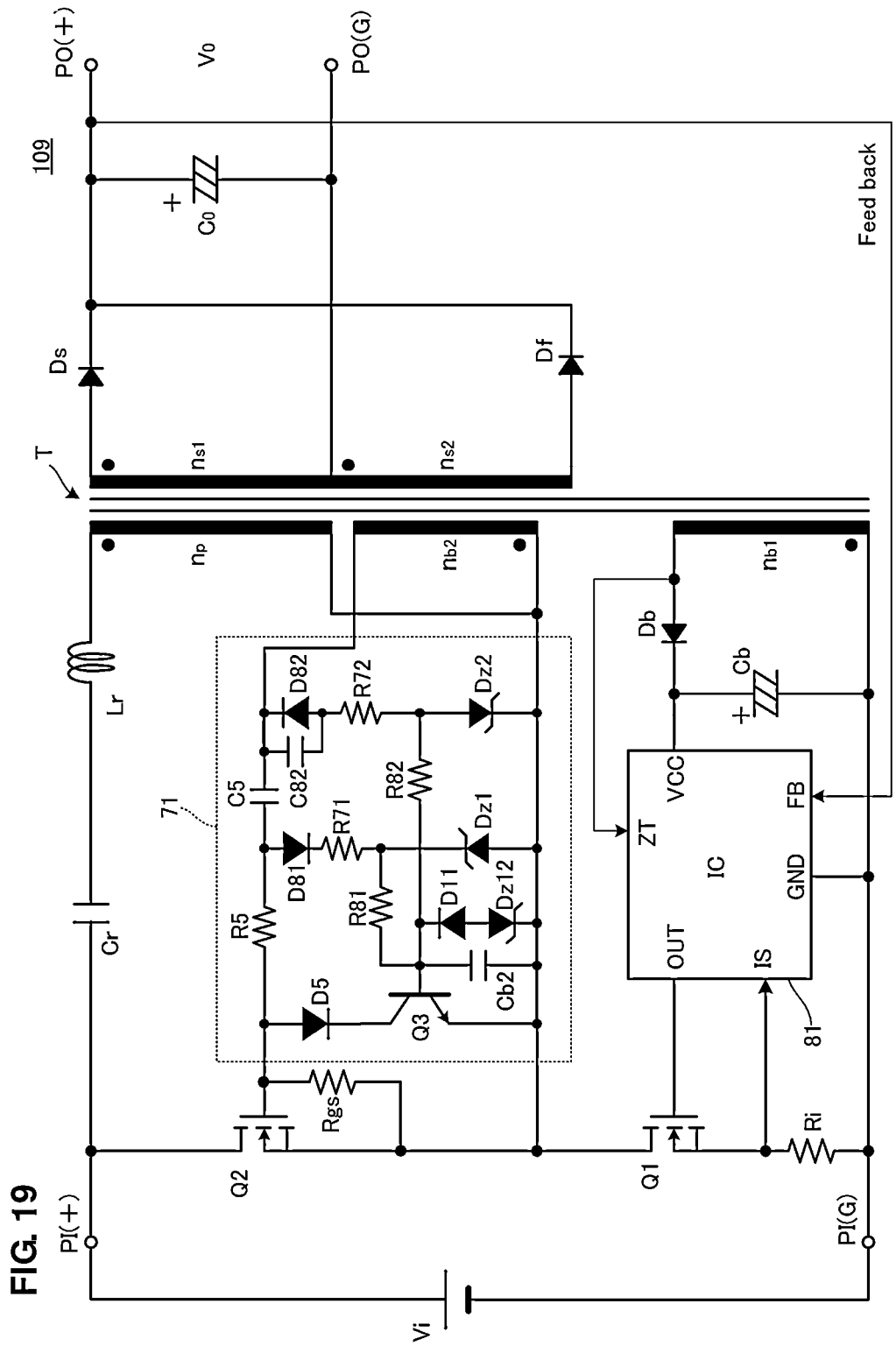
FIG. 19 is a circuit diagram of a switching power supply apparatus 109 according to a ninth preferred embodiment of the present invention.

FIG. 19 is the circuit diagram of a switching power supply apparatus 109 according to a ninth preferred embodiment.

The configuration of a second switching control circuit 71 is different from the switching power supply apparatus illustrated in FIG. 18. In the second switching control circuit 71, a capacitor C5 is series-connected to the resistor R5.

The capacitor C5 and the resistor R5 function as a delay circuit based on a time constant with relation to applying a voltage to the gate of the second switching element Q2, and controls the turnon delay time of the second switching element Q2 and a voltage value between the gate and source thereof, in relation to an input capacitance between the gate and source of the second switching element Q2.

Tenth Preferred Embodiment

Figure 20:
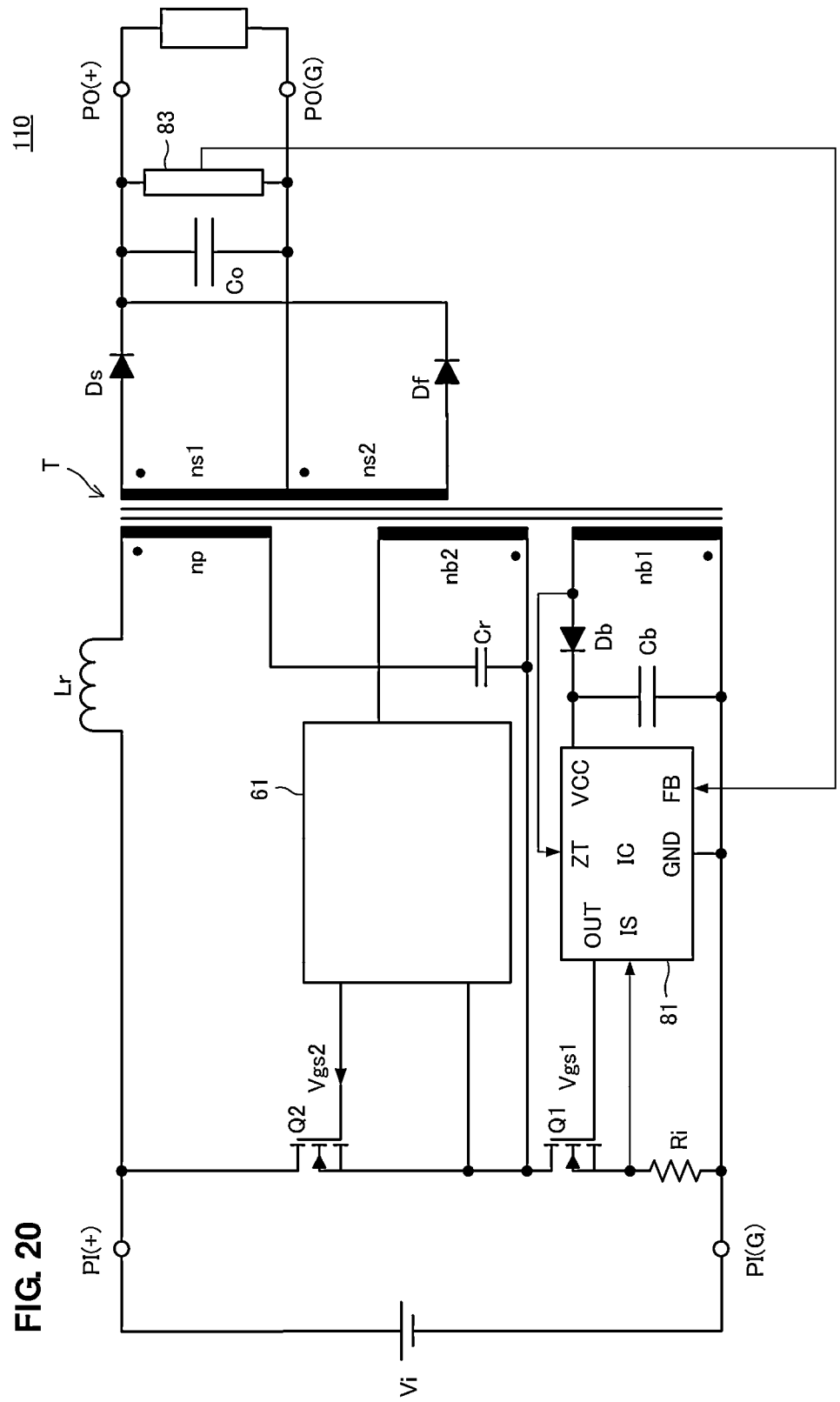
FIG. 20 is a circuit diagram of a switching power supply apparatus 110 according to a tenth preferred embodiment of the present invention.

FIG. 20 is the circuit diagram of a switching power supply apparatus 110 according to a tenth preferred embodiment.

The position of the capacitor Cr is different from the switching power supply apparatus illustrated in FIG. 2 in the first preferred embodiment.

Since it is only necessary for the resonance capacitor Cr to be inserted in a path through which a current flowing through the inductor Lr flows at the time of the off-state of the first switching element Q1, the capacitor Cr may also be connected between one end of the primary winding np and the source of the second switching element Q2, as illustrated in FIG. 20.

Eleventh Preferred Embodiment

Figure 21:
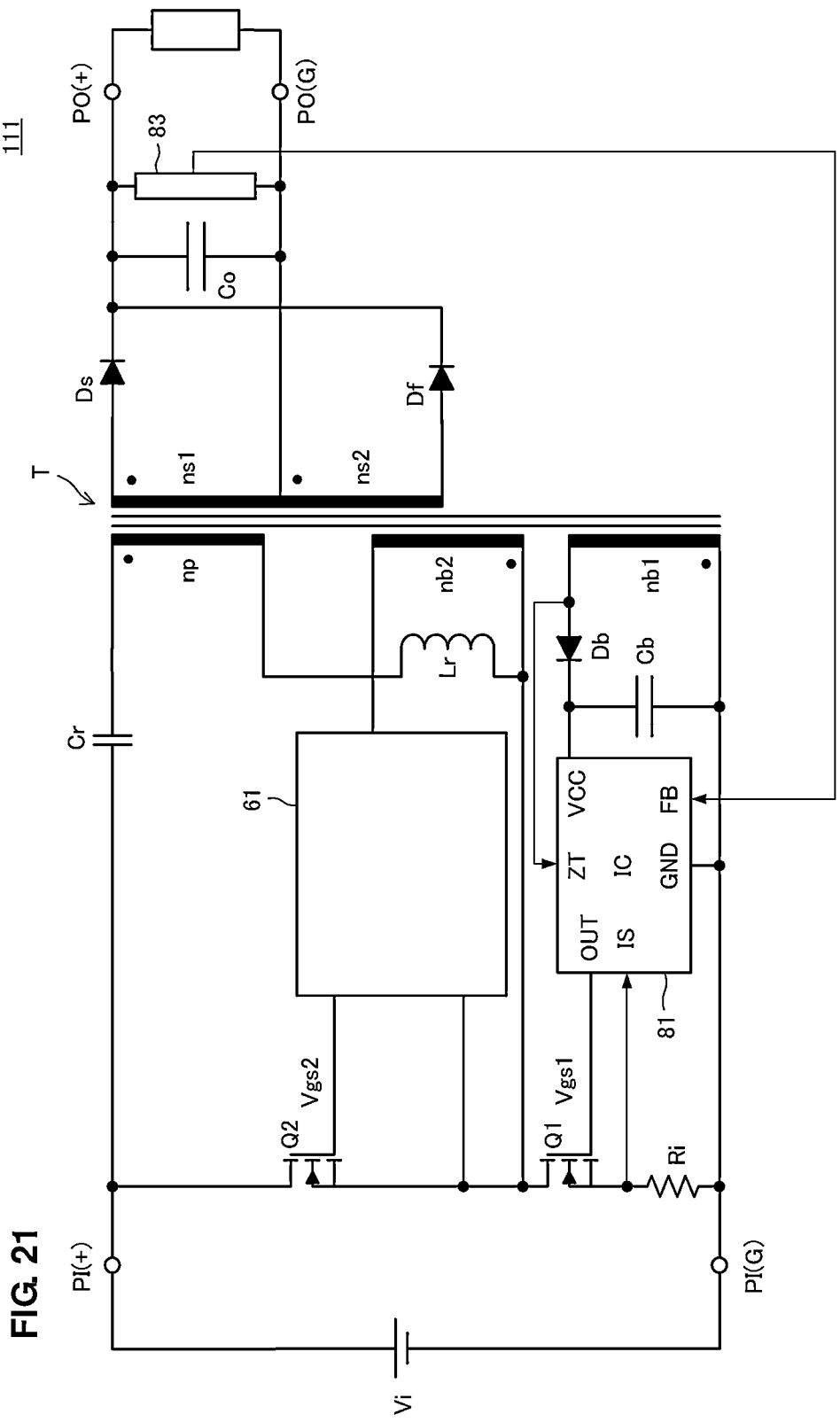
FIG. 21 is a circuit diagram of a switching power supply apparatus 111 according to an eleventh preferred embodiment of the present invention.

FIG. 21 is the circuit diagram of a switching power supply apparatus 111 according to an eleventh preferred embodiment.

The positions of the capacitor Cr and the inductor Lr are different from the switching power supply apparatus illustrated in FIG. 2 in the first preferred embodiment.

Since it is only necessary for the resonance capacitor Cr and the inductor Lr to be inserted in series in a path through which a current flowing through the inductor Lr flows at the time of the off-state of the first switching element Q1, the capacitor Cr and the inductor Lr may also be connected to both ends of the primary winding np, respectively, as illustrated in FIG. 21.

Twelfth Preferred Embodiment

Figure 22:
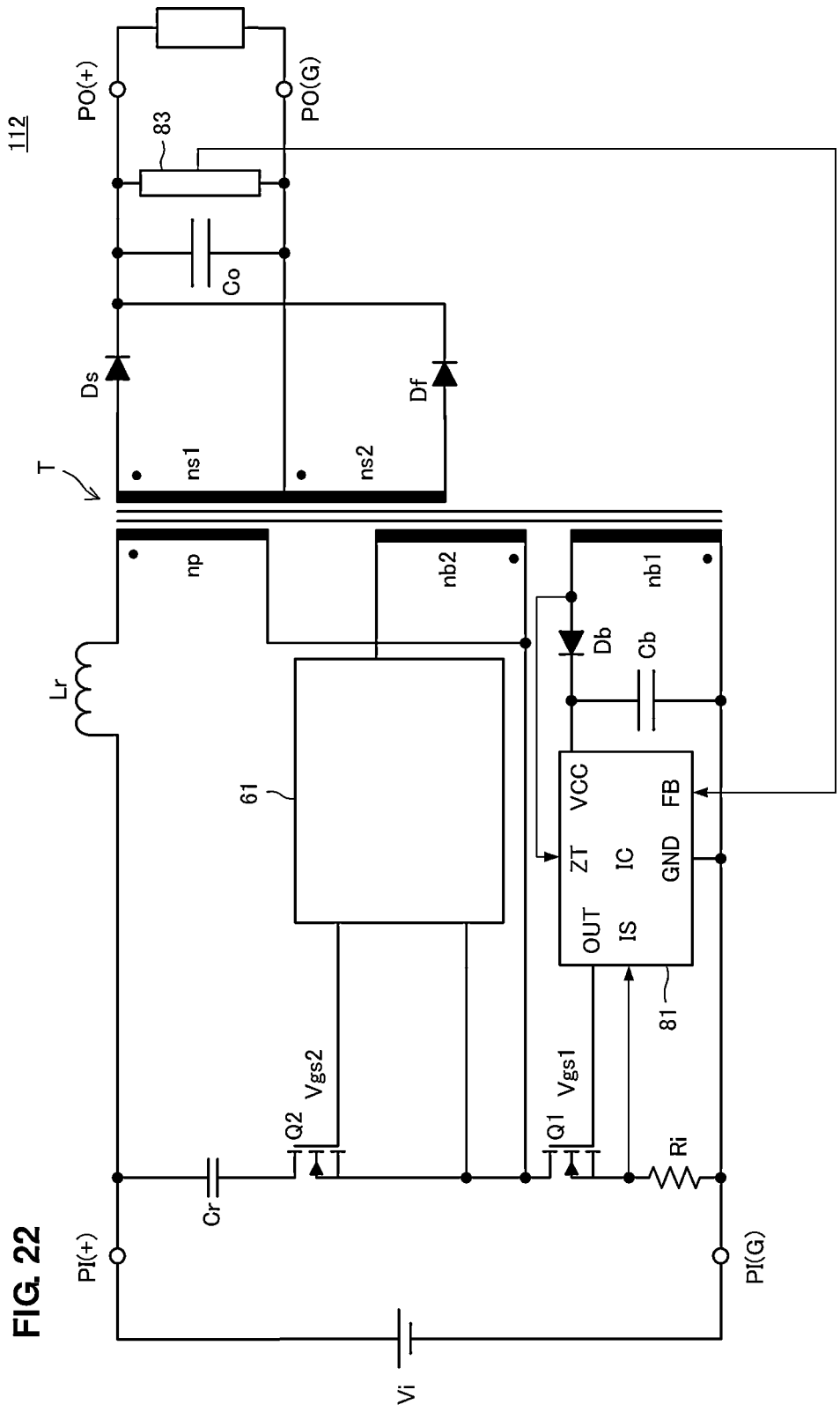
FIG. 22 is a circuit diagram of a switching power supply apparatus 112 according to a twelfth preferred embodiment of the present invention.

FIG. 22 is the circuit diagram of a switching power supply apparatus 112 according to a twelfth preferred embodiment.

The position of the capacitor Cr is different from the switching power supply apparatus illustrated in FIG. 2 in the first preferred embodiment.

It is only necessary for the resonance capacitor Cr to be inserted in a path through which a current flowing through the inductor Lr flows at the time of the off-state of the first switching element Q1. Therefore, the capacitor Cr may also be connected between the drain of the second switching element Q2 and the input terminal PI(+), as illustrated in FIG. 22.

Thirteenth Preferred Embodiment

Figure 23:
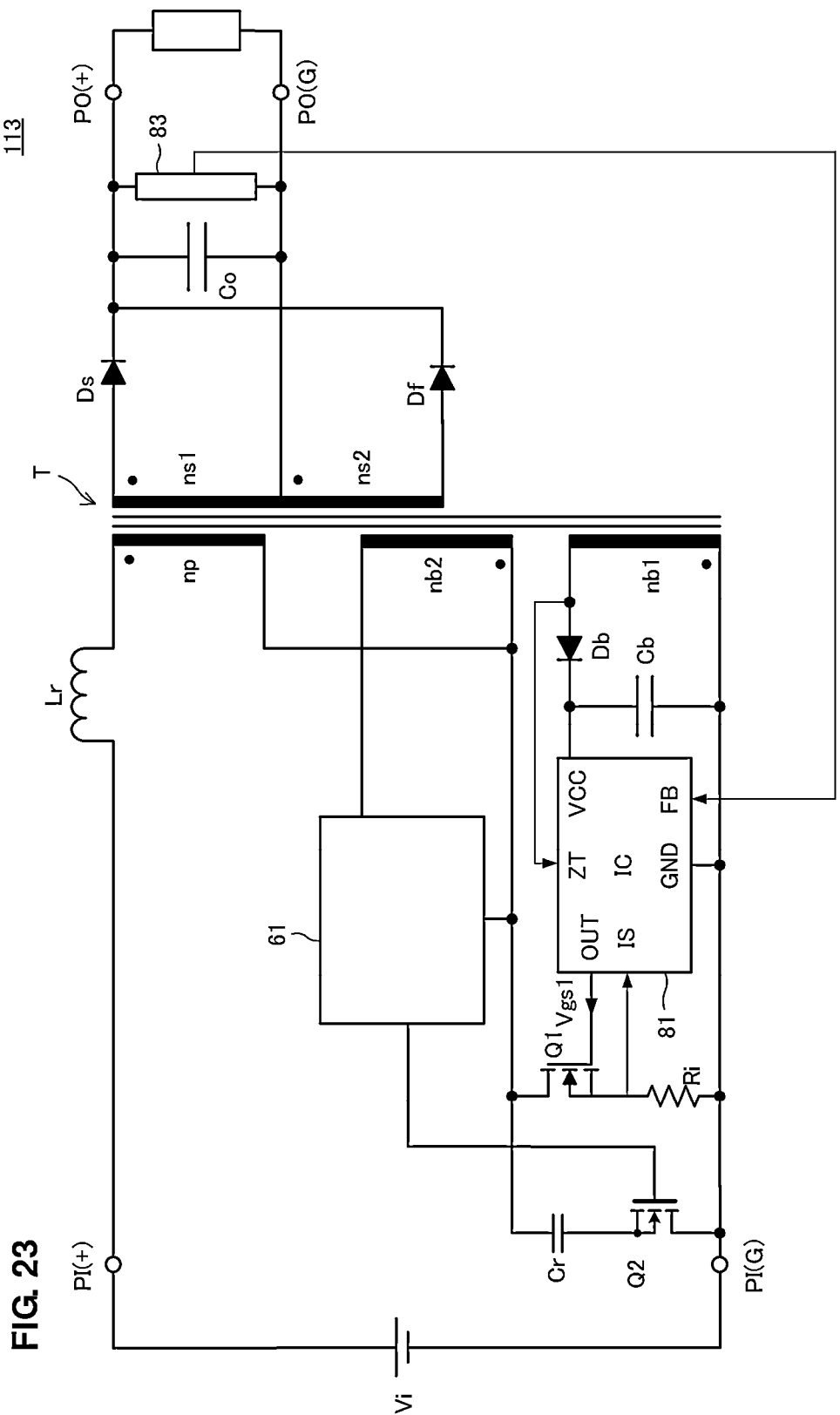
FIG. 23 is a circuit diagram of a switching power supply apparatus 113 according to a thirteenth preferred embodiment of the present invention.

FIG. 23 is the circuit diagram of a switching power supply apparatus 113 according to a thirteenth preferred embodiment.

The positions of the second switching element Q2 and the capacitor Cr are different from the switching power supply apparatus illustrated in FIG. 2 in the first preferred embodiment.

Since it is only necessary for the resonance capacitor Cr to be inserted in a path through which a current flowing through the inductor Lr flows at the time of the off-state of the first switching element Q1, the capacitor Cr may also be connected between the drain of the second switching element Q2 and the input terminal PI(G), as illustrated in FIG. 23.

Fourteenth Preferred Embodiment

Figure 24:
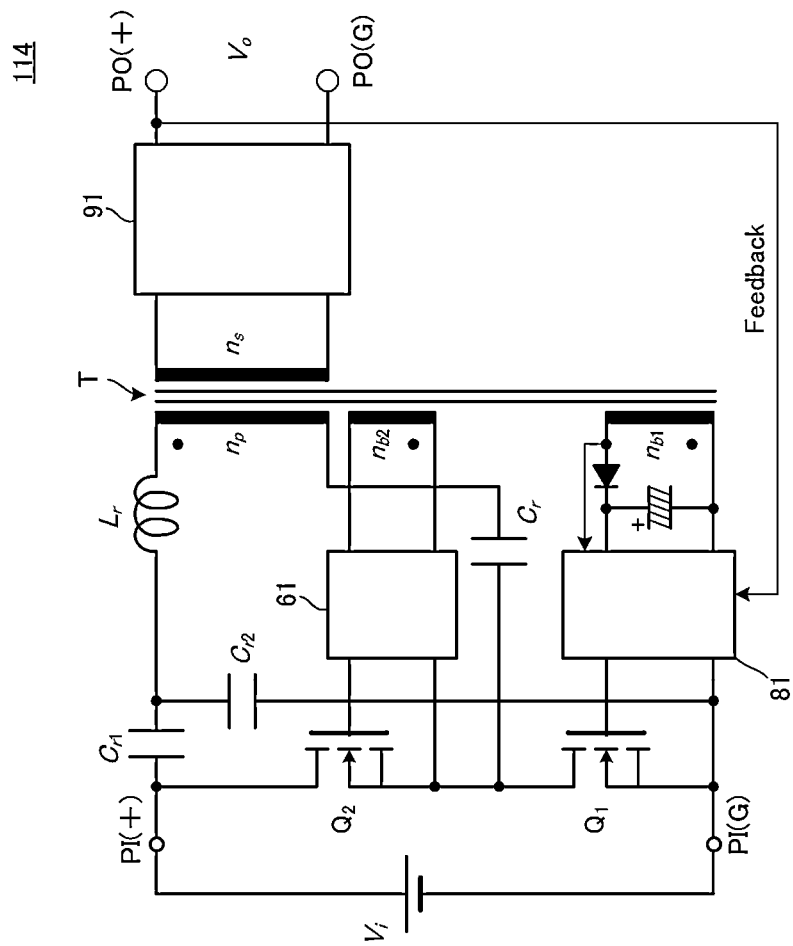
FIG. 24 is a circuit diagram of a switching power supply apparatus 114 according to a fourteenth preferred embodiment of the present invention.

FIG. 24 is the circuit diagram of a switching power supply apparatus 114 according to a fourteenth preferred embodiment.

It is different from the switching power supply apparatus illustrated in FIG. 20 in the tenth preferred embodiment in that capacitors Cr1 and Cr2 are provided in addition to the capacitor Cr.

The capacitors Cr and Cr1 are arranged so that the inductor, the primary winding np, the capacitor Cr, the second switching element Q2, and the capacitor Cr1 configure a closed-loop.

In addition, the capacitor Cr2 is connected between the connection point of the capacitor Cr1 with the inductor Lr and the input terminal PI(G). In this way, a plurality of resonance capacitors (Cr1, Cr2) may also be connected in series to the second switching element Q2.

The capacitor Cr2 is connected, and hence, a current supplied from the power-supply voltage V1 flows during both time periods of the on-time of the first switching element Q1 and the on-time of the second switching element Q2. Accordingly, compared with the circuit configuration in FIG. 23 where a current flows only during the on-time of the first switching element Q1, the effective current of a current supplied from the power-supply voltage V1 is reduced. Accordingly, it is possible to reduce a conduction loss due to the current supplied from the power-supply voltage V1.

Fifteenth Preferred Embodiment

Figure 25:
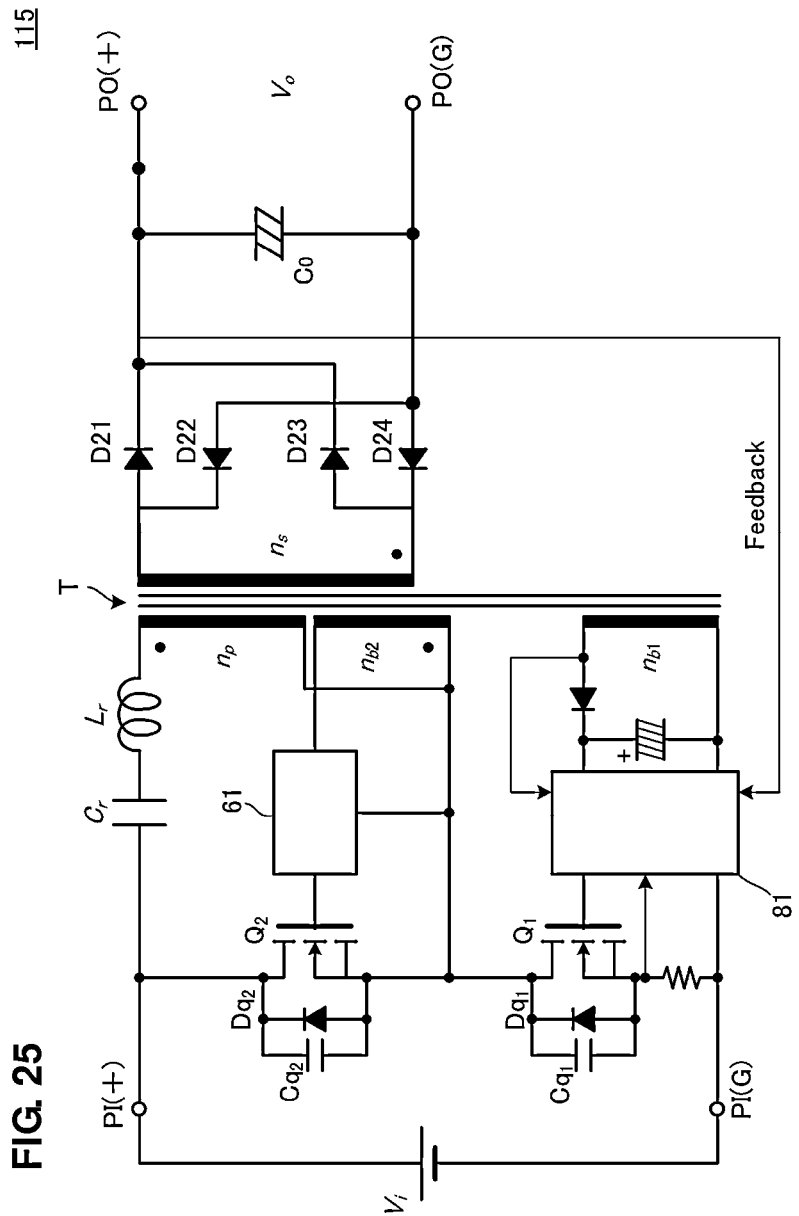
FIG. 25 is a circuit diagram of a switching power supply apparatus 115 according to a fifteenth preferred embodiment of the present invention.

FIG. 25 is the circuit diagram of a switching power supply apparatus 115 according to a fifteenth preferred embodiment.

The configuration of the secondary side of the transformer T is different from the switching power supply apparatus illustrated in FIG. 2 in the first preferred embodiment.

In the fifteenth preferred embodiment, a diode bridge circuit based on diodes D21, D22, D23, and D34 and a capacitor Co are connected to the secondary winding ns of the transformer T.

In this way, using the diode bridge circuit, full-wave rectification may also be performed.

Sixteenth Preferred Embodiment

Figure 26:
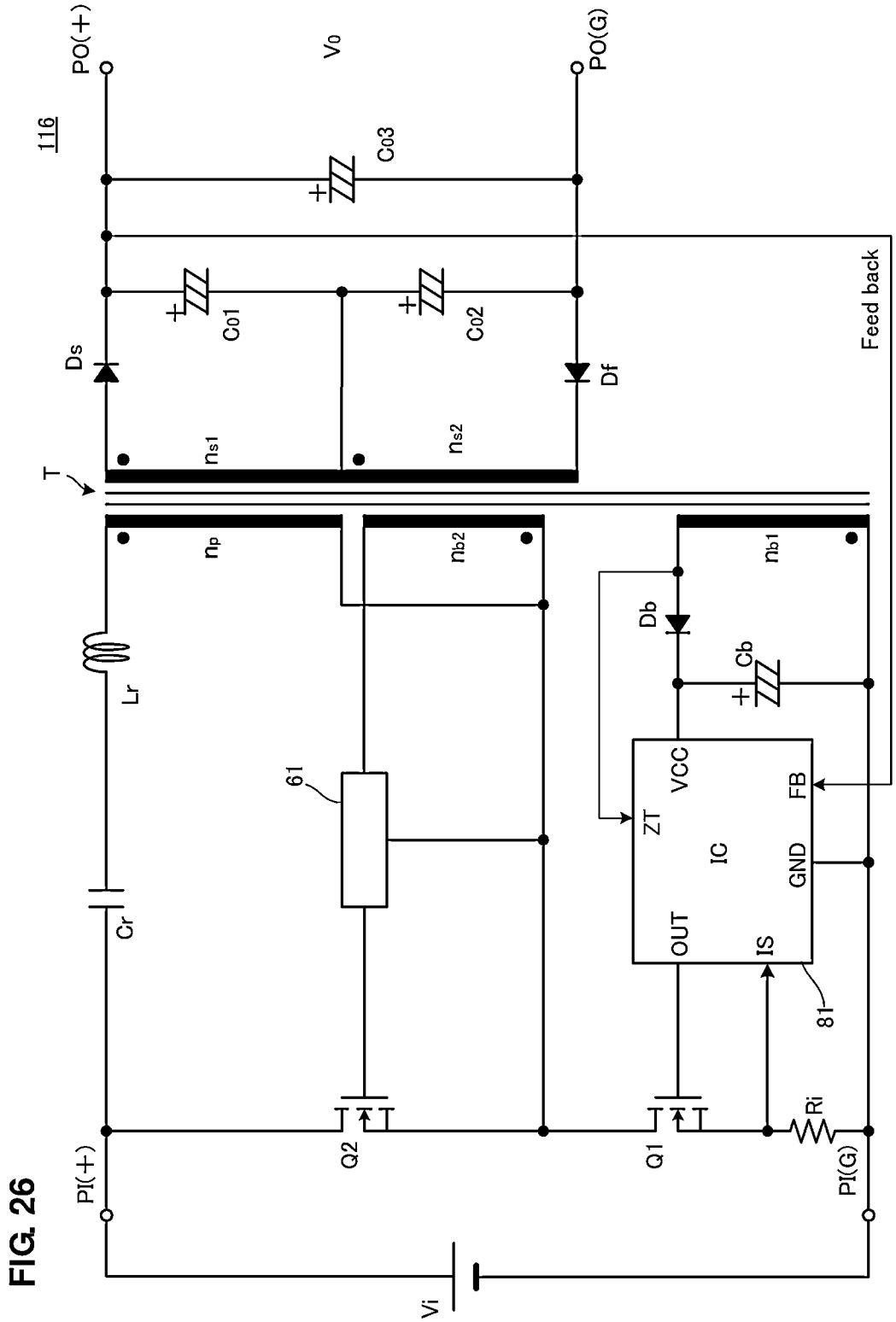
FIG. 26 is a circuit diagram of a switching power supply apparatus 116 according to a sixteenth preferred embodiment of the present invention.

FIG. 26 is the circuit diagram of a switching power supply apparatus 116 according to a sixteenth preferred embodiment.

The configuration of the secondary side of the transformer T is different from the switching power supply apparatus illustrated in FIG. 2 in the first preferred embodiment.

In the sixteenth preferred embodiment, a rectification smoothing circuit based on a diode Ds and a capacitor Co1 is configured between both ends of the secondary winding ns1 of the transformer T, and a rectification smoothing circuit based on a diode Df and a capacitor Co2 is configured between both ends of the secondary winding ns2. In addition, a capacitor Co3 is connected between the output terminals PO(+) and PO(G).

In this way, a voltage doubler rectifier circuit may also be adopted.

Other Preferred Embodiments

While, in each of the preferred embodiments illustrated above, a circuit is preferably provided in which the weight of a load is detected due to the voltage of the feedback signal, i.e., a current flowing through the load is indirectly detected, a circuit that directly detects a current flowing through the load may also be provided so as to detect whether or not being in a light load state. In this case, it is only necessary to adopt a configuration where a control signal is supplied to a switching control IC so that the blanking function of the switching control IC is activated at the time of the detection of a light load.

A circuit may also be configured so that the inversion of a winding voltage is detected due to a voltage change occurring between both ends of the first drive winding nb1 of the transformer T to thus detect the turnoff timing of the second switching element Q2.

In addition, the turnoff timing of the second switching element Q2 may also be detected on the basis of a change in the drain-to-source voltage of at least one of the first switching element Q1 and the second switching element Q2.

In addition, the turnoff timing of the second switching element Q2 may also be detected on the basis of a change in the drain current or the source current of at least one of the first switching element Q1 and the second switching element Q2.

In addition, various preferred embodiments of the present invention may be applied to a switching power supply apparatus complementarily and alternately turning on and off two switching elements, not only in a half-bridge converter but also in a multi-transistor converter such as a full-bridge converter or in a voltage clamp converter or the like, for example.

In addition, while, in some preferred embodiments illustrated above, an example has been illustrated where a voltage change occurring between both ends of the winding voltage of the transformer is preferably detected, a change in the drain-to-source voltage of at least one of the first switching element Q1 and the second switching element Q2 may also be detected. In addition, a change in the drain current or the source current of at least one of the first switching element Q1 and the second switching element Q2 may also be detected. In addition, a voltage change occurring between both ends of the first drive winding (nb1) may also be detected.

In addition, the inductor Lr illustrated in some preferred embodiments illustrated above may also be configured using the leakage inductance of the transformer T.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching power supply apparatus comprising:
    a direct-current power-supply input unit arranged to receive a direct-current input voltage;
    a transformer including at least a primary winding and a secondary winding magnetically coupled to each other;
    a first series circuit connected to both ends of the direct-current power-supply input unit and in which the primary winding, an inductor, and a first switching element are connected in series;
    a second series circuit connected to both ends of the first switching element or both ends of a series circuit including the primary winding and the inductor and in which a second switching element and a capacitor are connected in series;
    a switching control circuit configured to put the second switching element into an on-state during a predetermined time after having put the first switching element into an on-state during a predetermined time; and a first rectification smoothing circuit configured to rectify and smooth an alternating-current voltage output from the secondary winding and output an output voltage to a load; wherein the switching power supply apparatus includes a light load detection mechanism configured to directly or indirectly detect a load current flowing through the load and detect whether or not the load is in a light load state;

the switching control circuit includes:
  a first switching control circuit configured to control an on-time of the first switching element; and
  a second switching control circuit configured to control an on-time of the second switching element so that an on-time ratio serving as a ratio of the on-time of the second switching element to the on-time of the first switching element becomes almost constant with respect to a change in the load current; wherein in a normal load state, an operation is performed in a current-continuous mode where the first switching element and the second switching element are complementarily and repeatedly put into on-states and off-states in a relationship in which a switching frequency decreases as the load current increases; and when the light load detection mechanism has detected the light load state, an operation is performed in a current-discontinuous mode where a current halt time period in which no current flows through the transformer exists between turnoff of the second switching element and turnon of the first switching element, and a blank time is inserted between a time when the second switching element is turned off and a time when the first switching element is turned on next such that the switching frequency is decreased in the light load state.

2. A switching power supply apparatus comprising:
  a direct-current power-supply input unit arranged to receive a direct-current input voltage;
  a transformer including at least a primary winding and a secondary winding magnetically coupled to each other;
  a first series circuit in which a first switching element and a second switching element, connected to both ends of the direct-current power-supply input unit, are connected in series;
  a second series circuit connected to both ends of the second switching element and in which the primary winding, an inductor, and a capacitor are connected in series;
  a switching control circuit configured to put the second switching element into an on-state during a predetermined time after having put the first switching element into an on-state during a predetermined time; and
  a first rectification smoothing circuit configured to rectify and smooth an alternating-current voltage output from the secondary winding and output an output voltage to a load; wherein the switching power supply apparatus includes a light load detection mechanism configured to directly or indirectly detect a load current flowing through the load and detect whether or not the load is in a light load state;

the switching control circuit includes:
  a first switching control circuit configured to control an on-time of the first switching element; and
  a second switching control circuit configured to control an on-time of the second switching element so that an on-time ratio serving as a ratio of the on-time of the second switching element to the on-time of the first switching element becomes almost constant with respect to a change in the load current; wherein in a normal load state, an operation is performed in a current-continuous mode where the first switching element and the second switching element are complementarily and repeatedly put into on-states and off-states in a relationship in which a switching frequency decreases as the load current increases; and when the light load detection mechanism has detected the light load state, an operation is performed in a current-discontinuous mode where a current halt time period in which no current flows through the transformer exists between turnoff of the second switching element and turnon of the first switching element, and a blank time is inserted between a time when the second switching element is turned off and a time when the first switching element is turned on next such that the switching frequency is decreased in the light load state.

3. The switching power supply apparatus according to claim 1, wherein the transformer includes a first drive winding, and a second rectification smoothing circuit that supplies a direct-current power-supply voltage to the switching control circuit is provided in the first drive winding.

4. The switching power supply apparatus according to claim 1, further comprising:
  a timing detection mechanism configured to detect a timing when the second switching element is turned off and a winding voltage of the transformer is inverted; and
  a feedback circuit configured to generate a feedback signal used to detect and control an output voltage; wherein
  the first switching control circuit is a circuit that causes the first switching element to be turned on with a delay after the timing detected by the timing detection mechanism and causes the first switching element to be turned off after a time corresponding to a voltage of the feedback signal has elapsed.

5. The switching power supply apparatus according to claim 4, wherein the timing detection mechanism detects a voltage change occurring between both ends of the winding voltage of the transformer.

6. The switching power supply apparatus according to claim 4, wherein the timing detection mechanism detects a change in a drain-to-source voltage of at least one of the first switching element and the second switching element.

7. The switching power supply apparatus according to claim 4, wherein the timing detection mechanism detects a change in a drain current or a source current of at least one of the first switching element and the second switching element.

8. The switching power supply apparatus according to claim 4, wherein the timing detection mechanism detects a voltage change occurring between both ends of the first drive winding.

9. The switching power supply apparatus according to claim 1, wherein
  the transformer includes a second drive winding;
  a connection point of the first switching element with the second switching element and a first end of the second drive winding are connected to each other;
  the second switching control circuit is connected between a second end of the second drive winding and a control terminal of the second switching element; and
  the second switching control circuit is a circuit that causes the second switching element to be turned on, using a voltage of the second drive winding, which occurs due to turnoff of the first switching element.

10. The switching power supply apparatus according to claim 1, wherein the second switching control circuit is a circuit that performs control so that the on-time ratio becomes almost one.

11. The switching power supply apparatus according to claim 9, wherein when the on-time ratio, the direct-current input voltage, the output voltage, the number of turns of the primary winding, and the number of turns of the secondary winding are expressed with Da, Vi, Vo, np, and ns, respectively, the second switching control circuit is a circuit that causes the second switching element Q2 to be turned off by performing control so that the Da becomes larger than ns·Vi/np·Vo.

12. The switching power supply apparatus according to claim 9, wherein when the on-time ratio, the direct-current input voltage, the output voltage, the number of turns of the primary winding, and the number of turns of the secondary winding are expressed with Da, Vi, Vo, np, and ns, respectively, the switching power supply apparatus is a circuit that causes the second switching element Q2 to be turned off by performing control so that the Da becomes larger than ns·Vi/np·Vo−1.

13. The switching power supply apparatus according to claim 1, wherein the light load detection mechanism performs detection using a voltage of the feedback signal.

14. The switching power supply apparatus according to claim 1, wherein the light load detection mechanism performs detection based on whether or not a switching frequency for driving the first switching element or the second switching element has reached an upper limit value.

15. The switching power supply apparatus according to claim 1, wherein in the current-discontinuous mode, along with a decrease in the load current, the switching control circuit causes a switching frequency to drive the first switching element or the second switching element to decrease.

16. The switching power supply apparatus according to claim 1, wherein in the current-discontinuous mode, along with a decrease in the load current, the switching control circuit reduces the on-time of the first switching element or the second switching element.

17. The switching power supply apparatus according to claim 1, wherein in the current-continuous mode, the switching control circuit sets a maximum level of the switching frequency or a maximum value of the on-time of the first switching element or the second switching element.

18. The switching power supply apparatus according to claim 1, wherein in the current-discontinuous mode, the switching control circuit controls the switching frequency or the on-time of the first switching element or the second switching element, in response to the feedback signal.

19. The switching power supply apparatus according to claim 1, wherein the switching control circuit sets a limit value on a voltage of the feedback signal, and causes switching of the first switching element or the second switching element to be halted when the voltage of the feedback signal has exceeded the limit value.

20. The switching power supply apparatus according to claim 19, wherein the switching control circuit operates with a lowest switching frequency and a minimum on-time, with respect to the limit value.

21. The switching power supply apparatus according to claim 1, wherein in the current-discontinuous mode, while the switching control circuit does not cause the second switching element to be turned on even if the first switching element has been turned off, the switching control circuit applies a forward current to a parasitic diode of the second switching element first, and applies a backward current during a subsequent reverse recovery time.

22. The switching power supply apparatus according to claim 1, wherein at least one rectifying element in the first switching element, the second switching element, or the first rectification smoothing circuit is a field-effect transistor.

23. The switching power supply apparatus according to claim 1, wherein the inductor includes a leakage inductance of the transformer.

* * * * *